US009918133B2

(12) United States Patent
Utsuki et al.

(10) Patent No.: US 9,918,133 B2
(45) Date of Patent: Mar. 13, 2018

(54) ELECTRONIC APPARATUS, DISPLAY CONTROLLING METHOD FOR ELECTRONIC APPARATUS AND GRAPHICAL USER INTERFACE

(75) Inventors: Shingo Utsuki, Kanagawa (JP); Kazuto Nishizawa, Kanagawa (JP); Daisuke Inaishi, Tokyo (JP); Ko Kusanagi, Kanagawa (JP); Hiroshi Sato, Kanagawa (JP); Daisuke Sato, Kanagawa (JP); Kenichi Moriwaki, Tokyo (JP); Satoshi Kanda, Tokyo (JP); Yuji Ishimura, Tokyo (JP); Shimon Sakai, Tokyo (JP); Masahiro Urano, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 1441 days.

(21) Appl. No.: 13/430,790

(22) Filed: Mar. 27, 2012

(65) Prior Publication Data

US 2012/0183273 A1 Jul. 19, 2012

Related U.S. Application Data

(63) Continuation of application No. 11/185,950, filed on Jul. 21, 2005, now abandoned.

(30) Foreign Application Priority Data

Jul. 22, 2004 (JP) ................................ 2004-213795

(51) Int. Cl.
*H04N 5/445* (2011.01)
*H04N 21/472* (2011.01)
(Continued)

(52) U.S. Cl.
CPC ... *H04N 21/47214* (2013.01); *H04N 5/44543* (2013.01); *H04N 5/782* (2013.01);
(Continued)

(58) Field of Classification Search
CPC ......... H04N 21/23109; H04N 21/4332; H04N 21/482
(Continued)

(56) References Cited

U.S. PATENT DOCUMENTS 5,990,884 A 11/1999 Douma et al.
6,370,550 B1 4/2002 Douma et al.
(Continued)

FOREIGN PATENT DOCUMENTS

EP 875837 11/1998
JP 8-194608 7/1996
(Continued)

OTHER PUBLICATIONS

Notification of Reasons for Refusal dated Sep. 10, 2008 by the Japanese Patent Office for corresponding Japanese Patent Application No. 2004-213795, pp. 1-7.
(Continued)

*Primary Examiner* — Pankaj Kumar
*Assistant Examiner* — Franklin Andramuno
(74) *Attorney, Agent, or Firm* — Lerner, David, Littenberg, Krumholz & Mentlik, LLP

(57) ABSTRACT

A graphical user interface is disclosed which achieves an easy search for a desired item. When an operation inputting section accepts a selective operation input for selection of one of plural processing functions, plural representation images individually representing plural processing object items of the processing function are displayed in an array along one direction of a display screen such that one of the representation images can be selected as a noticed represen-
(Continued)

tation image by an inputting operation through the operation inputting section. A decision section decides whether plural processing object items of the selected processing function are divided in a plurality of groups. If the processing object items are divided in groups, then the group name of the group to which the processing object item of the noticed representation image belongs is displayed in the proximity of the noticed representation image.

9 Claims, 25 Drawing Sheets

(51) Int. Cl.
 H04N 21/231 (2011.01)
 H04N 21/433 (2011.01)
 H04N 5/782 (2006.01)
 H04N 21/482 (2011.01)
(52) U.S. Cl.
 CPC ... *H04N 21/23109* (2013.01); *H04N 21/4332* (2013.01); *H04N 21/482* (2013.01)
(58) Field of Classification Search
 USPC .................................................. 725/39, 52
 See application file for complete search history.

(56) References Cited

U.S. PATENT DOCUMENTS

| 6,973,621 | B2* | 12/2005 | Sie .................... H04N 21/00 715/720 |
| 7,340,677 | B2* | 3/2008 | Cowperthwaite ............ 715/719 |
| 2002/0087979 | A1 | 7/2002 | Dudkiewicz et al. |
| 2002/0144269 | A1 | 10/2002 | Connelly |
| 2003/0016304 | A1 | 1/2003 | Norsworthy et al. |
| 2003/0090524 | A1* | 5/2003 | Segerberg et al. ........... 345/786 |
| 2003/0126605 | A1 | 7/2003 | Betz et al. |
| 2003/0140341 | A1 | 7/2003 | Nakashima |
| 2003/0184658 | A1 | 10/2003 | Fredlund et al. |
| 2004/0113929 | A1* | 6/2004 | Matsuzaki .................... 345/700 |
| 2004/0148628 | A1 | 7/2004 | Mears |
| 2006/0143656 | A1 | 6/2006 | Sakamoto et al. |
| 2008/0127266 | A1 | 5/2008 | Ward et al. |

FOREIGN PATENT DOCUMENTS

| JP | 9-37181 | 2/1997 |
| JP | 2002-366273 | 12/2002 |
| JP | 2003-337643 | 11/2003 |
| JP | 2004-21893 | 1/2004 |
| JP | 2004-96725 | 3/2004 |

OTHER PUBLICATIONS

DVD recorder mounting a hard disk drive "PSX" (DESR-7000 DESR-5000) catalog, Japan, Sony Corporation, Dec. 2003, pp. 2-11.

Hirohiko Takuchi, Decision of buying or not, PSX Performance as a recorder, Nikkei PC, Japan, Nikkei BP Co. Ltd., Jan. 19, 2004, No. 449, pp. 108-115.

Ubiquitous communication, Start for next! Sony "PSX" High-speed GUI by video image Part 1, Japan, Windows CE FAN, Oct. 20, 2003, http://www.wince.ne.jp/snap/ceSnapView.asp?PID=1488, pp. 1-4.

\* cited by examiner

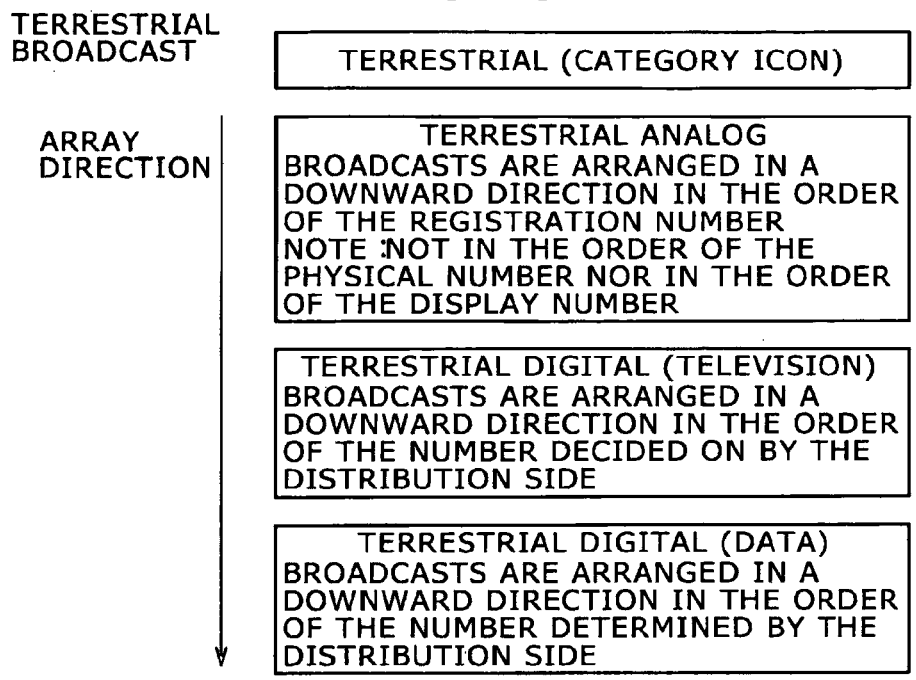
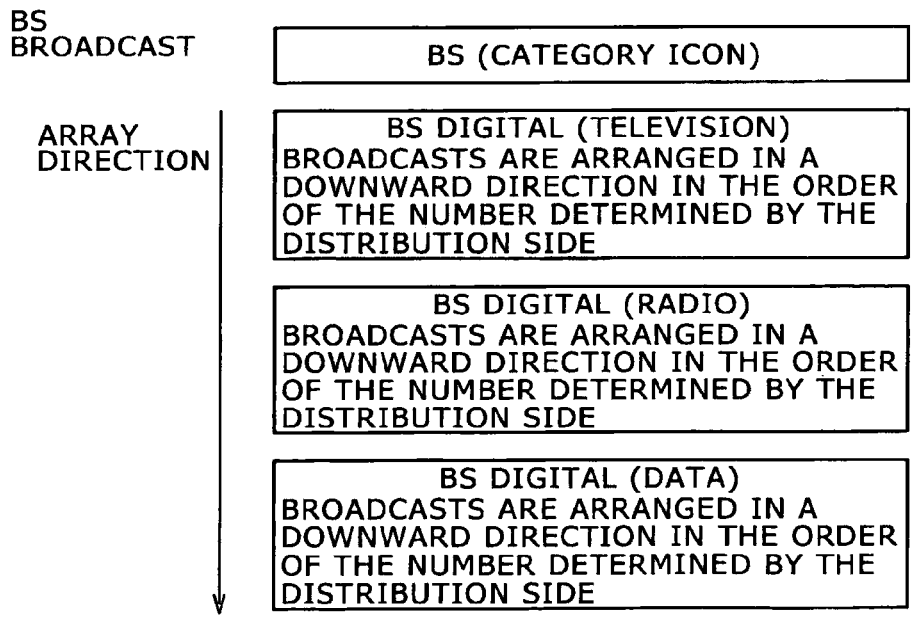

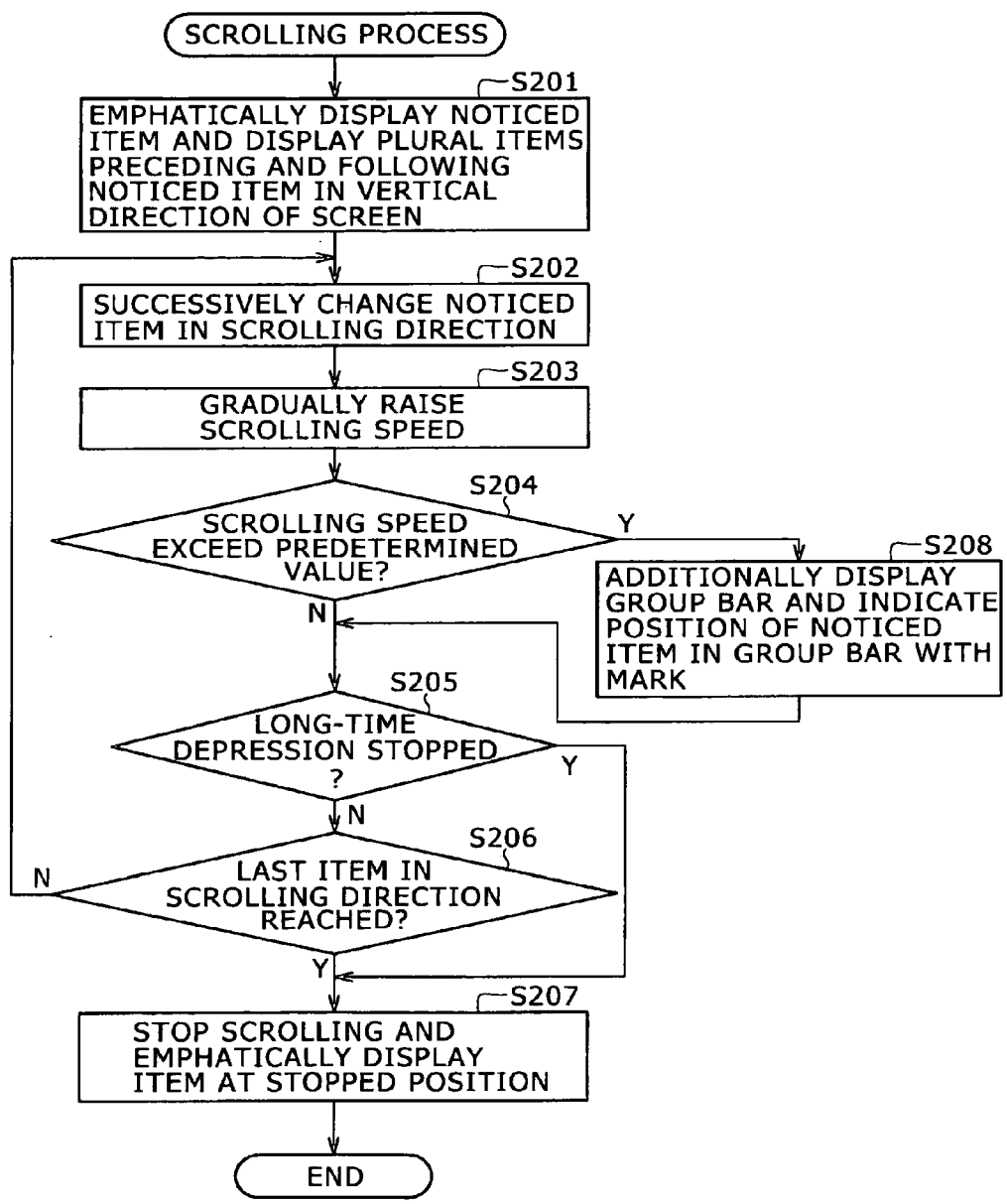

ELECTRONIC APPARATUS, DISPLAY CONTROLLING METHOD FOR ELECTRONIC APPARATUS AND GRAPHICAL USER INTERFACE

This is a continuation of U.S. application Ser. No. 11/185,950, filed Jul. 21, 2005 (currently pending), which is incorporated herein by reference and which claims benefit of priority of Japanese Patent Application No. 2004-213-795, filed Jul. 22, 2004, which is also incorporated herein by reference.

BACKGROUND OF THE INVENTION

This invention relates to an electronic apparatus such as a broadcast reception apparatus which can receive various types of broadcasts such as, for example, terrestrial analog broadcasts, terrestrial digital broadcasts, BS (Broadcasting Satellite) broadcasts and CS (Communication Satellite) broadcasts and a recording and/or reproduction apparatus and a display controlling method for an electronic apparatus of the type mentioned.

Media used to provide image and music contents have been diversified, and also contents provided have been diversified and increased in quantity. For example, if only broadcasting media are taken, terrestrial analog broadcasting, terrestrial digital broadcasting, BS broadcasting, CS broadcasting media and so forth are available. Further, in the digital broadcasting media, the number of available program channels is as great as, for example, 150 channels. Furthermore, not only television programs but also radio programs and data broadcasting programs are provided by some channels.

Conventionally, also a multimedia reproduction apparatus which can reproduce contents of such various media as described above has been proposed and is disclosed, for example, in Japanese Patent Laid-Open No. Hei 11-73418 (hereinafter referred to as Patent Document 1) (which corresponds to U.S. Pat. Nos. 5,990,884 and 6,370,550 and European Patent Application No. 875,837 A2).

Also a recording and/or reproduction apparatus has been proposed wherein a hard disk apparatus having a large storage capacity is used to record and reproduce a large amount of broadcasting program contents.

SUMMARY OF THE INVENTION

Incidentally, where channel selection in such a reception apparatus for multi-channel broadcasting programs as described above or selection of a reproduction content from among recorded contents in a recording and/or reproduction apparatus which includes a storage apparatus of a large storage capacity is performed merely such that a table of broadcasting channels or a table of contents is displayed in the form of a list on a display screen and a channel or a reproduction content is selected from within the list display, it is very cumbersome to find out a desired broadcasting channel or content.

Thus, in electronic apparatus of the type described such as recording and/or reproduction apparatus and reception apparatus, a graphical user interface is demanded by which a user can rapidly search out a broadcasting program content of a broadcasting channel which the user wants to enjoy or a recorded content which the user wants to reproduce.

It is desirable to provide an electronic apparatus which makes it possible to search out a processing object item readily.

In order to desire described above, according to an embodiment of the present invention, there is provided an electronic apparatus including a processing function execution section for executing a plurality of processing functions, a display data storage section for storing a plurality of display data of representation images individually representing a plurality of processing object items of the processing functions individually with regard to the plural processing functions, an operation inputting section for accepting an operation input of a user and outputting a corresponding operation output signal, a representation image display order data storage section for storing, for the individual ones of the plural processing functions, representation image display order data including data relating to an array order when the plural representation images are to be displayed on a display screen and including, where the plural processing object items of the processing functions are divided into a plurality of groups, coordination data between names of the groups and data relating to the array order in the individual groups, and a display control section for displaying, when the operation inputting section accepts a selection operation input for selecting one of the plural processing functions, the plural representation images using the display data stored in the display data storage section and the representation image display order data stored in the representation image display order data storage section such that the plural representation images are arrayed along one direction of the display screen and one of the plural representation images can be selected as a noticed representation image in response to an operation input through the operation inputting section, the display control section including a decision section for deciding, when the operation inputting section accepts a selection operation input for selecting one of the plural processing functions, whether or not the plural processing object items of the selected processing function is divided in a plurality of groups, and a group name displaying section for displaying, when the decision section decides that the plural processing object items are divided in a plurality of groups, the group names of the groups to which the processing object item of the noticed representation image belongs in the proximity of the noticed representation image based on the storage contents of the representation image display order data storage section.

In the electronic apparatus, those of a plurality processing functions whose processing object item number is great can be divided into groups in advance. Then, a plurality of representation images individually representing a plural number of processing object items regarding one of the plurality of processing functions which is selected by a user are displayed in a state, wherein they are arrayed in one direction on the display screen, and one of the plural displayed representation images which is in a selected condition is determined as a noticed representation image and is displayed emphatically.

Then, it is decided whether or not a plurality of processing object items relating to a processing function selected by the user are divided in a plurality of groups. If it is decided that the plural processing object items are divided in a plurality of groups, then the group name of the group to which the processing object item of the noticed representation image belongs is displayed in the proximity of the noticed representation image based on the stored contents of the representation image display order data storage section.

Thus, in the electronic apparatus, where the number of processing object items regarding a processing function is great, the processing object items are divided into groups, and it is displayed as a group name on the screen to which one of the groups the noticed representation image belongs so that this may be recognized by the user. Consequently, a search of the processing object items can be performed easily by referring to the group name.

According to another embodiment of the present invention, there is provided an electronic apparatus including a display data storage section for storing a plurality of display data of representation images which individually represent a plurality of processing object items, an operation inputting section for accepting an operation input of a user and outputting a corresponding operation output signal, a presenting and accepting section for presenting an operation screen for dividing the plural processing object items into groups to the user and accepting grouping information of the plural processing object items in response to an operation input of the user through the operation screen and the operation inputting section, a representation image display order data storage section for performing grouping of the plural processing object items based on the grouping information and storing representation image display order data relating to an array order when the plural representation images are to be displayed on a display screen and including coordination data between the group names of the groups and the data relating to the array order in the groups, and a display control section for displaying the plural representation images using the display data stored in the display data storage section and the representation image display order data stored in the representation image display order data storage section such that the plural representation images are arrayed along one direction of the display screen and one of the plural representation images can be selected as a noticed representation image in response to an operation input through the operation inputting section and displaying the group names of the groups to which the processing object item of the noticed representation image belongs in the proximity of the noticed representation image.

In the electronic apparatus, an operation screen for grouping processing object items is provided to the user, and consequently, the user can perform grouping of the processing object items through the operation screen.

Further, also in the electronic apparatus, it is displayed similarly as a group name on the screen to which one of groups a noticed representation image belongs so that this may be recognized by the user. Consequently, a search of the processing object items can be performed easily by referring to the group name set by the user itself and displayed corresponding to the noticed representation image.

According to a further embodiment of the present invention, there is provided electronic apparatus comprising a processing function execution section for executing a plurality of processing functions, a display data storage section for storing a plurality of display data of representation images individually representing a plurality of processing object items of the processing functions individually with regard to the plural processing functions, an operation inputting section for accepting an operation input of a user and outputting a corresponding operation output signal, a representation image display order data storage section for storing, for the individual ones of the plural processing functions, representation image display order data including data relating to an array order when the plural representation images are to be displayed on a display screen and including, where the plural processing object items of the processing functions are divided into a plurality of groups, coordination data between names of the groups and data relating to the array order in the individual groups, and a display control section for displaying, when the operation inputting section accepts a selection operation input for selecting one of the plural processing functions, the plural representation images using the display data stored in the display data storage section and the representation image display order data stored in the representation image display order data storage section such that the plural representation images are arrayed along one direction of the display screen and one of the plural representation images can be selected as a noticed representation image in response to an operation input through the operation inputting section, the display control section including a decision section for deciding, when the operation inputting section accepts a selection operation input for selecting one of the plural processing functions, whether or not the plural processing object items of the selected processing function is divided in a plurality of groups, and a bar displaying section for additionally displaying, when the decision section decides that the plural processing object items are divided in a plurality of groups, a bar display which is divided in accordance with the plural groups and includes, at each of the divisional portions thereof, a mark including a group name display and indicating at which position the noticed representation image is positioned in an array of the plural representation images including the noticed representation image on the display screen.

According to a still further embodiment of the present invention, there is provided an electronic apparatus including a display data storage section for storing a plurality of display data of representation images which individually represent a plurality of processing object items, an operation inputting section for accepting an operation input of a user and outputting a corresponding operation output signal, a presenting and accepting section for presenting an operation screen for dividing the plural processing object items into groups to the user and accepting grouping information of the plural processing object items in response to an operation input of the user through the operation screen and the operation inputting section, a representation image display order data storage section for performing grouping of the plural processing object items based on the grouping information and storing representation image display order data relating to an array order when the plural representation images are to be displayed on a display screen and including coordination data between the group names of the groups and the data relating to the array order in the groups, and a display control section for displaying the plural representation images using the display data stored in the display data storage section and the representation image display order data stored in the representation image display order data storage section such that the plural representation images are arrayed along one direction of the display screen and one of the plural representation images can be selected as a noticed representation image in response to an operation input through the operation inputting section and additionally displaying a bar display which is divided in accordance with the plural groups and includes, at each of the divisional portions thereof, a mark including a group name display and indicating at which position the noticed representation image is positioned in an array of the plural representation images including the noticed representation image on the display screen.

In the electronic apparatus according to the further embodiment and the still further embodiment of the present invention, representation images are divided into a plurality of groups based on attributes relating to selection object items such as, for example, the substance of processing function items or the substance of processing object contents, and the display order of a plurality of representation images on the display screen are decided for each group. Then, a bar display which is displayed on the screen during scrolling is divided in accordance with the groups and includes a group name display indicating a group corresponding to the divisional portion and a mark display indicating at which position the noticed representation image is positioned in the bar display.

Accordingly, the user can recognize in which group the mark corresponding to the noticed representation image is positioned in the bar display. Consequently, the user can easily recognize to which group the noticed representation image belongs.

With all of the electronic apparatus above, even where the number of processing object items such as broadcasting channels to be selected or recorded contents to be selected is great, since the plural processing object items are divided in groups and the group name of the group to which a noticed object item of a noticed representation image is displayed corresponding to the noticed representation image, a processing object item can be searched readily by referring to the displayed group name.

Particularly where a bar display including a mark which indicates at which one of plural representation images the noticed representation image is positioned is displayed on the screen, the position of the noticed representation image from among the plural representation images can be confirmed at a glance, which facilitates a search for a representation image.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 5 to 8 are diagrammatic views illustrating array orders of the second items in the broadcast reception apparatus of FIG. 1;

FIGS. 22 to 26 are flow charts illustrating scrolling processing action on the graphical user interface in the broadcast reception apparatus of FIG. 1.

DETAILED DESCRIPTION OF THE PREFERRED EMBODIMENTS

In the following, broadcast reception apparatus each as an electronic apparatus to which the present invention is applied are described. The broadcast reception apparatus are configured so as to receive broadcasting signals from a plurality of different types of broadcasting media and cumulatively record received data of a broadcasting program content into a storage section of a large storage capacity. Further, the broadcast reception apparatus of the embodiments of the present invention described below use an icon as a representation image.

First Embodiment

Figure 1:
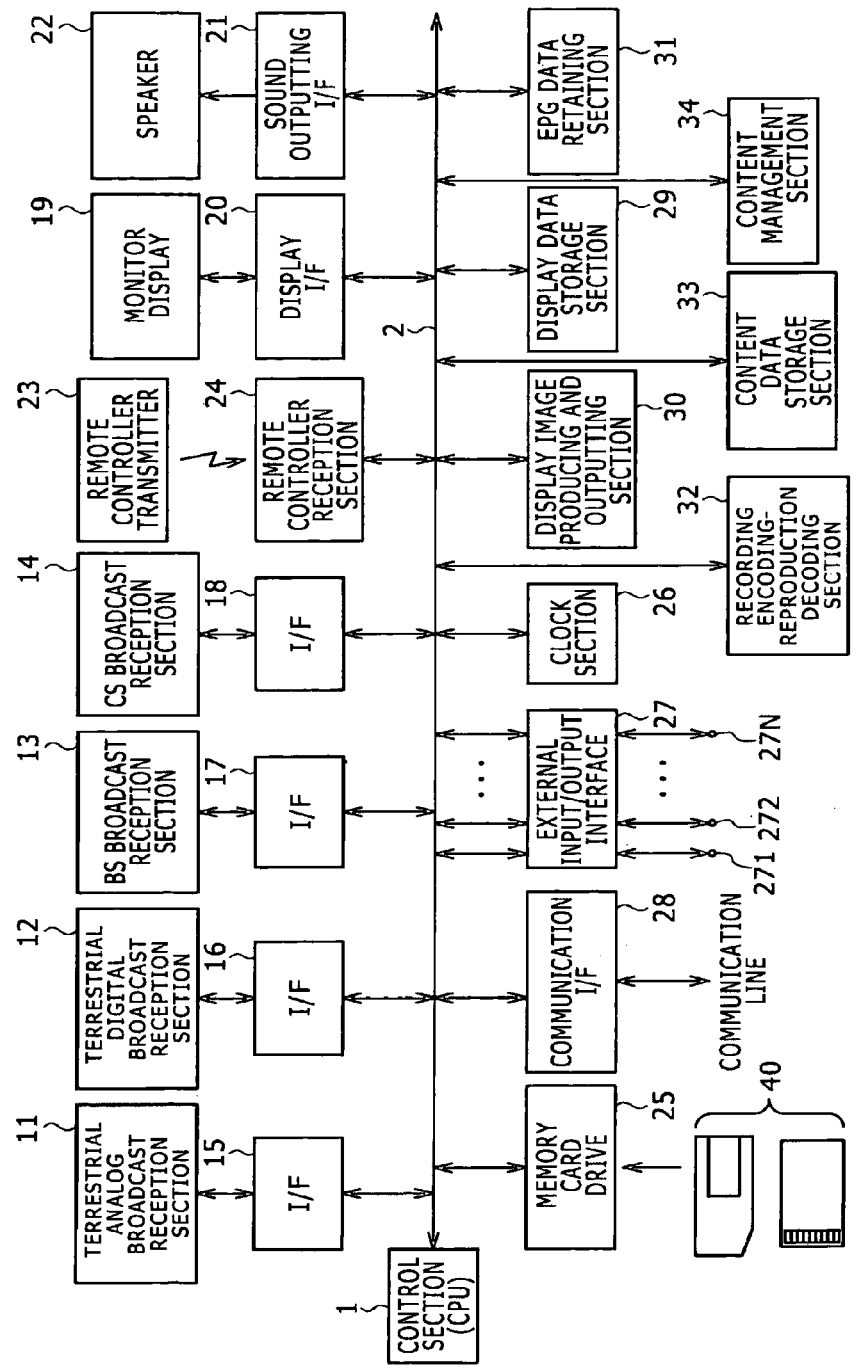
FIG. 1 is a block diagram showing an example of a hardware configuration of a broadcast reception apparatus as an electronic apparatus to which the present invention is applied.

FIG. 1 shows an example of a hardware configuration of a broadcast reception apparatus as an electronic apparatus according to a first embodiment of the present invention.

Referring to FIG. 1, the broadcasting reception apparatus is configured such that various broadcast reception sections and various processing sections such as an image output display section, a sound outputting section and an operation inputting section are connected to a system bus 2 which is in turn connected to a control section 1 formed from a microcomputer.

In particular, the broadcasting reception apparatus includes a terrestrial analog broadcast reception section 11, a terrestrial digital broadcast reception section 12, a BS broadcast reception section 13 and a CS broadcast reception section 14 as the broadcast reception sections. The terrestrial analog broadcast reception section 11, terrestrial digital broadcast reception section 12, BS broadcast reception section 13 and CS broadcast reception section 14 are connected to the system bus 2 through interfaces 15, 16, 17 and 18 provided therefor, respectively.

The terrestrial analog broadcast reception section 11 selectively receives existing terrestrial analog television broadcasting signals and outputs an image signal (video signal) and a sound signal (audio signal) to the system bus 2 through the interface 15.

The terrestrial digital broadcast reception section 12 is ready for digital television broadcasting, digital audio broadcasting and data broadcasting and selectively receives and decodes a broadcasting program in response to a selection operation of a user. Then, the terrestrial digital broadcast reception section 12 outputs an image signal (video signal), a sound signal (audio signal) and data such as EPG (Electronic Programming Guide) data to the system bus 2 through the interface 16.

The BS broadcast reception section 13 is ready for BS television broadcasting, BS audio broadcasting and data broadcasting and selectively receives and decodes a broadcasting program in response to a selection operation of a user. Then, the BS broadcast reception section 13 outputs an image signal (video signal), a sound signal (audio signal) and data such as EPG data to the system bus 2 through the interface 17.

The CS broadcast reception section 14 is ready for CS television broadcasting, CS audio broadcasting and data broadcasting and selectively receives and decodes a broadcasting program in response to a selection operation of a user. Then, the CS broadcast reception section 14 outputs an image signal (video signal), a sound signal (audio signal) and data such as EPG data to the system bus 2 through the interface 18.

Further, in the broadcasting reception apparatus shown in FIG. 1, a monitor display unit 19 formed from a CRT (Cathode Ray Tube), an LCD (Liquid Crystal Display) panel or the like is connected as an image outputting display section to the system bus 2 through a display interface 20. Further, in the broadcasting reception apparatus, a speaker 22 is connected as a sound outputting section to the system bus 2 through a sound outputting interface 21.

Further, in the broadcasting reception apparatus, a remote controller transmitter 23 is provided as an operation inputting section, and a remote controller reception section 24 for receiving a remote control signal from the remote controller transmitter 23 is connected to the system bus 2. The remote controller transmitter 23 in the broadcasting reception apparatus includes at least leftward and rightward direction indicating operation buttons and upward and downward direction indicating operation buttons, a "home" button, a "determination" button and a "return" button. In response to an operation of any of such buttons by the user through the remote controller transmitter 23, a selection instruction or the like is performed on a graphical user interface screen.

It is to be noted that the leftward and rightward direction indicating operation buttons and upward and downward direction indicating operation buttons can be formed from, for example, a cross-shaped upward, downward, leftward and rightward indicating button, a joystick or some other element.

Further, a memory card drive 25, a clock section 26, an external input/output interface 27, a communication interface 28 and a display image producing and outputting section 30, a display data storage section 29 and an EPG retaining section 31 are connected to the system bus 2. Further, a recording encoding-reproduction decoding section 32, a content data storage section 33 and a content management section 34 are connected to the system bus 2.

The control section 1 includes a CPU (Central Processing Unit), a program ROM (Read Only Memory), a working area RAM (Random Access Memory) and so forth and executes various processes using the working area RAM in accordance with a program written in the program ROM.

Each of the broadcast reception sections 11 to 14 selects, from among object broadcasting signals received by an antenna not shown, a broadcasting program in response to a selection operation of a user inputted through the remote controller transmitter 23 and signals image data and sound data of the selected broadcasting program or data received from a data broadcast to the system bus 2.

While the broadcasting reception apparatus of the present embodiment provides a broadcasting program to the user from one of the broadcast reception sections 11 to 14, which one of the broadcast reception sections 11 to 14 is to be selected depends upon a selective operation input from the remote controller transmitter 23 through a graphical user interface hereinafter described.

The memory card drive 25 is provided to read data from a memory card 40 inserted therein or write data into the memory card 40. The apparatus shown in FIG. 1 can read out and write data from and into various types of memory cards.

The clock section 26 provides information of the time at present and calendar information. The clock section 26 is used also for reservation setting of a broadcasting program and measurement of times of various timers corresponding to such reservation setting.

The external input/output interface 27 includes various external input/output terminals such as video input/output terminals, audio input/audio terminals and USB (Universal Serial Bus) terminals and transfers signals between the input/output terminals and the system bus 2.

The communication interface 28 is connected to a communication line and is used to transmit, where a data broadcast program is a bidirectional broadcast, a response signal to a predetermined destination or acquire data broadcast contents from a server apparatus through a network. It is to be noted that the communication interface 28 may be used additionally to fetch data such as data of a web content through the Internet or signal predetermined information through the Internet.

The display data storage section 29 stores data of icons which form the graphical user interface hereinafter described, channel display data, and other display data such as character data. Further, the display data storage section 29 produces and stores icons or thumbnail images as representation images of broadcasting program contents stored in the content data storage section 33.

The display image producing and outputting section 30 produces an image to be displayed on the monitor display unit 19 under the control of the control section 1 and forms a display control section together with the control section 1.

The display image producing and outputting section 30 stores image data and music data from the broadcast reception sections 11 to 14 into an output buffer built therein. Further, the display image producing and outputting section 30 acquires data for displaying characters and symbols for the graphic user interface from the display data storage section 29 and stores the data as on-screen display data into an on-screen buffer built therein. The on-screen display data are used to be displayed in an overlapping relationship with a reproduced image displayed on the screen of the monitor display unit 19. At this time, the data and the display image are displayed such that the display image can be observed from below, for example, through the overlapping image such as the graphical user interface image.

The display image producing and outputting section 30 supplies composite data of data stored in the output buffer and on-screen display data stored in the on-screen buffer to the monitor display unit 19 through the display interface 20.

The EPG retaining section 31 retains data of an electronic program guide (EPG data) in a memory built therein. The EPG data used here are obtained, with regard to a terrestrial analog broadcast, from a television broadcast signal wherein the EPG data are superposed within a vertical blanking period, and, with regard to a digital broadcast, from a data broadcast sent in the digital broadcast. The EPG data include data of the name of a broadcasting station, the name of a broadcasting program, the starting time of the program, the ending time of the program, performers, the genre of the program and so forth of each of broadcasting programs.

The EPG retaining section 31 retains EPG data received from the broadcast reception sections 11 to 14 into a memory thereof. The EPG data retained in the EPG retaining section 31 are updated so as to be the latest data.

It is to be noted that the EPG data to be used may not be acquired from a broadcasting signal on which the EPG data are superposed but may otherwise be acquired, for example, from an EPG data providing server connected to the Internet by accessing the EPG data providing server using the communication interface 28.

The recording encoding-reproduction decoding section 32 has a function of performing, when data of a broadcasting program content received by any of the broadcast reception sections 11 to 14 and inputted to the system bus 2 are stored into the content data storage section 33, a recording encoding process the data into data of a format used for storage into the content data storage section 33. The recording encoding-reproduction decoding section 32 has another function of performing a reproduction decoding process corresponding to the recording encoding process for data read out from the content data storage section 33 to reproduce the data of the broadcasting program content.

The content data storage section 33 in the present example is formed from a hard disk apparatus of a large storage capacity and used to store image data and/or sound data of broadcasting program contents and other data.

The content management section 34 stores and manages management data for contents stored in the content data storage section 33. The content management section 34 can use part of the recording area of a hard disk as a storage section for management data.

Here, as the management data, information of the recording year, month, day and time (year, month, day and time of storage) of broadcasting program contents recorded in the content data storage section 33 and relating information extracted from EPG data such as, for example, information of a genre, performers or the like are stored and managed in an associated relationship with the respective broadcasting program contents.

Further, the content management section 34 stores and manages also group management information of content data as management data in addition to reproduction history information such as the number of times of reproduction of each broadcasting program content stored in the content data storage section 33. The group management information includes also information of an array order of icons or thumbnail images as representation images of the broadcasting program contents on the display screen. Also information of the array order of channel items of broadcasting media in this example is included in the group management information.

Graphical User Interface

In the broadcasting reception apparatus of the present embodiment, selection of a broadcasting medium, selection of a broadcasting program and selection of any other function can be performed simply and readily by a user using a graphical user interface.

The graphical user interface of the broadcasting reception apparatus of the present embodiment includes a plurality of icons which can be selectively designated by a user through an operation of a predetermined button key of the remote controller transmitter 23 and explanation information of the icons.

The icons to be displayed on the screen of the monitor display unit 19 include category icons representing broadcasting media, setting functions, categories of processing functions of an external output, content storage media and so forth and processing objects, and item icons representing processing function items belonging to the categories (which therefore form a lower hierarchy) and items of processing object contents. It is to be noted that, although a thumbnail image can be used as a representation image, for the simplified description, it is assumed that, in the following description, an item icon includes a representation image formed from a thumbnail image.

In the present embodiment, seven category titles of "setting", "HDD", "video", "terrestrial broadcast", "BS broadcast", "CS broadcast" and "external input" are set in advance as the categories to be represented by the category icons. Data of the seven category icons corresponding to the seven category titles are stored in the display data storage section 29. Here, the "HDD" signifies a hard disk apparatus as a content storage medium in the present example.

The number of item icons representing processing function items and items of processing object contents in a lower hierarchy of each category differs among different categories.

Figure 2:
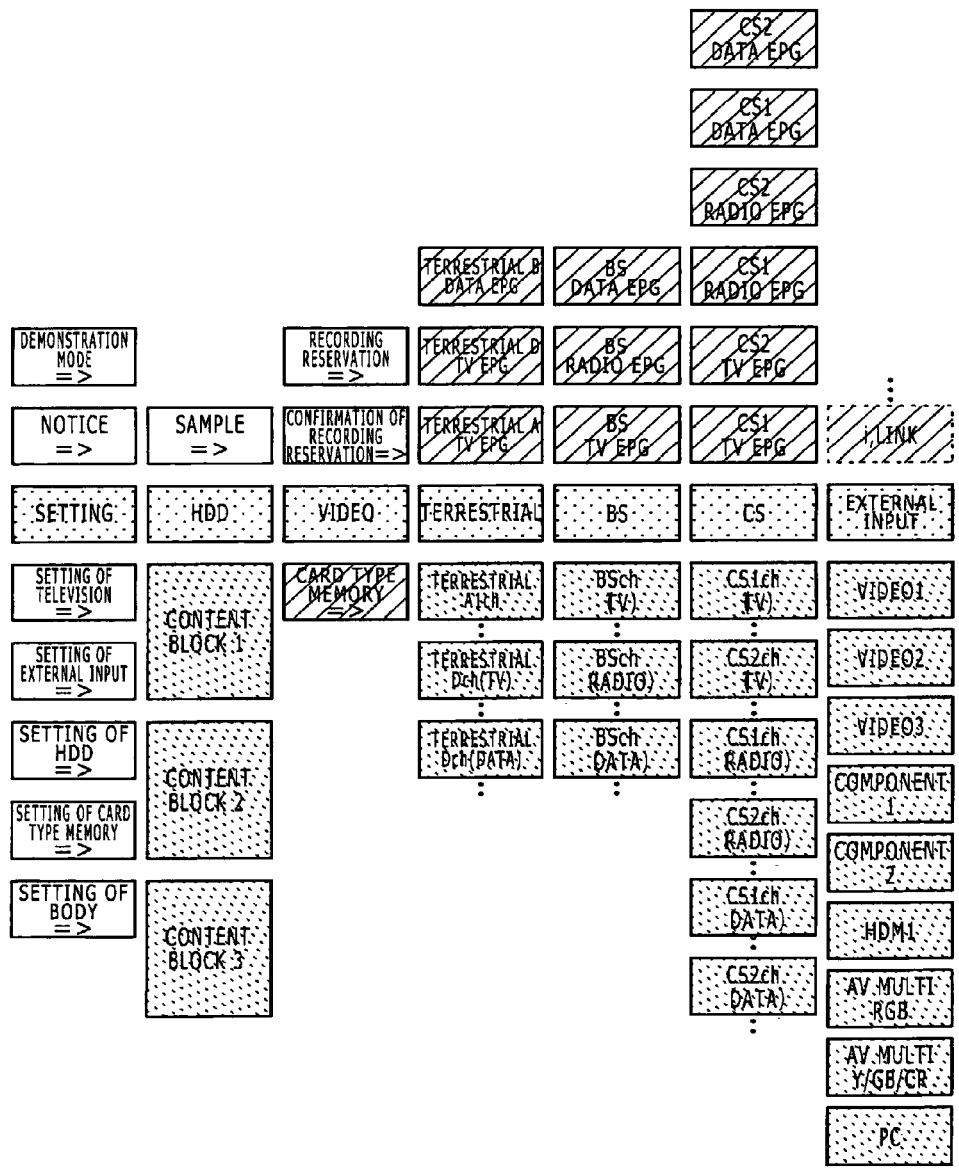
FIG. 2 is a diagrammatic view illustrating a relationship between categories as a first item and a second item of a lower hierarchy in the broadcast reception apparatus of FIG. 1.

FIG. 2 shows an example of a plurality of categories (category titles) and items individually belonging to the categories in the broadcasting reception apparatus of the present embodiment. In particular, in FIG. 2, a plurality of categories indicated by halftone dots are shown arrayed in a horizontally row, and a plurality of items belonging to each category are shown arrayed in an upward and downward column from the category. In FIG. 2, each item belonging to a category indicates that, where "=>" is described in the description of the explanation of the item, it has items of a lower hierarchy.

Meanwhile, each item indicated by rightwardly upwardly inclined slanting lines is an item of utility (called utility item). On the other hand, each item indicated by rightwardly downwardly inclined slanting lines is an item whose function completes (called function completion item) and may be a content selection item of a broadcasting channel or the like or an input changeover item. Further, each item to which none of halftone dots or slanting lines are applied signifies a logic folder.

As seen in FIG. 2, for example, the category of "setting" includes only items of logic folders and particularly includes a plurality of items such as "setting of television", "setting of external input" and "setting of HDD".

For the category of "HDD", an item of "sample" is provided as a utility item above the category title, and stored broadcasting program content items extracted from the outputs of the broadcast reception sections 11 to 14 of the broadcasting media and stored are provided as function completion items.

The stored broadcasting program content items are divided into blocks depending upon the broadcasting object such as, for example, a television broadcast, a radio broadcast or a data broadcast as an attribute regarding the broadcasting program content. In particular, in the example of FIG. 2, the stored broadcasting program content items are divided into three blocks of a content block 1, a content block 2 and a content block 3. Each of the content blocks is formed from one of a group of broadcasting program contents of television broadcasts, a group of broadcasting program contents of radio broadcasts and a group of broadcasting program contents of data broadcasts.

Further, in the present embodiment, in each of the contents blocks for the television broadcast, radio broadcast and data broadcast, a plurality of stored broadcasting program content items are grouped in accordance with a grouping criterion set by the user as hereinafter described.

Further, the category of "video" includes items, as items of logic folders, of recording reservation, recording reservation confirmation and so forth and further includes, as a utility item, an item of "card type memory".

Further, each of the categories of broadcasting media includes utility items indicated above the category title and broadcasting channel items as function completion items indicated below the category title.

The items of broadcasting channels which are function completion items belonging to the categories of broadcasting media are grouped for each broadcasting object such as a television, a radio and data. In particular, selection object items belonging to the category of each broadcasting medium are grouped based on the broadcasting object as an attribute relating to the selection object item. This grouping in the present example is not set by the user but is set in advance.

In particular, in the example of FIG. 2, the selection object items of the category of the terrestrial broadcasting media are divided into a group of terrestrial analog broadcasting channels ("terrestrial A1 ch" is one of the channels), another group of television channels of terrestrial digital broadcasts ("terrestrial D ch (TV)" is one of the channels), and a further group of data broadcasts of the terrestrial digital broadcasts ("terrestrial D ch (data)" is one of the channels).

The selection object items of the category of the BS broadcasting media are divided into a group of television channels of the BS broadcasts ("BS ch (TV)" is one of the channels), another group of radio channels of the BS broadcasts ("BS ch (radio)" is one of the channels), and a further group of data broadcasts of the BS broadcasts ("BS ch (data) is one of the channels).

Further, the category of the CS broadcasting media includes two broadcasting media of CS1 and CS2, and the selection object items thereof are divided into a group of television channels of the CS1 broadcast ("CS1 ch (TV)" is one of the channels), another group of television channels of the CS2 broadcasts ("CS2 ch (TV)" is one of the channels), a further group of radio channels of the CS1 broadcast ("CS1 ch (radio)" is one of the channels), a still further group of radio channels of the CS2 broadcasts ("CS2 ch (data)" is one of the channels), a yet further group of data broadcasts of the CS1 broadcast ("CS1 ch (data)" is one of the channels), and a yet further group of data broadcasts of the CS2 broadcast ("CS2 ch (data)" is one of the channels.

Further, as regards an EPG as a utility item in the category of each of the broadcasting media, an EPG corresponding to each group is prepared. For example, "terrestrial A TV EPG" is an EPG for a terrestrial analog television broadcast; "terrestrial D TV EPG" is an EPG for a terrestrial digital television broadcast; and "terrestrial D data EPG" is an EPG for a data broadcast of a terrestrial digital broadcast.

The "external input" category includes, as function completion items, such input changeover items as "video 1", "video 2" and "component 1".

In the present embodiment, a graphical user interface is provided wherein a structure which includes a plurality of processing function items and such items as a processing object contents substance item immediately below each of the plural categories shown in FIG. 2 is reflected on the display of the screen of the monitor display unit 19.

In particular, each of the categories of FIG. 2 is displayed, on the screen of the monitor display unit 19, in the form of a corresponding icon (hereinafter referred to as category icon), and each of the items shown in FIG. 2 is displayed, on the screen of the monitor display unit 19, in the form of a corresponding icon (hereinafter referred to as item icon). Thus, in a conception, FIG. 2 illustrates a relationship between the category icons and the item icons immediately below the category icons.

Figure 3:
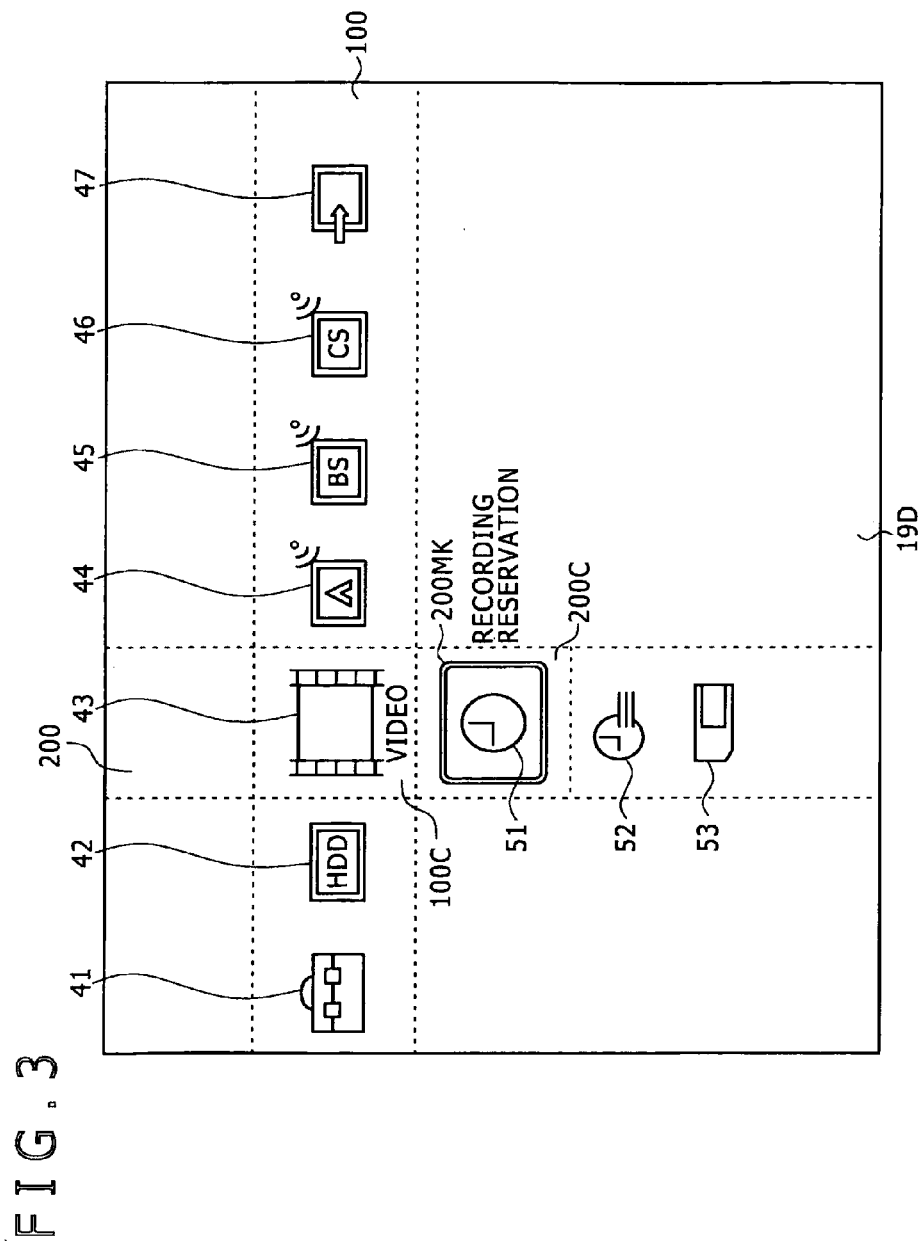
FIGS. 3 and 4 are diagrammatic views showing examples of a graphical user interface screen of the broadcast reception apparatus of FIG. 1.

FIG. 3 shows an example of an initial menu screen of a graphical user interface screen displayed on the screen 19D of the monitor display unit 19 in the present embodiment. In the present embodiment, the graphical user interface screen is displayed on or erased from the screen 19D every time the "home" button provided on the remote controller transmitter 23 which forms the operation inputting section is operated.

On the initial menu screen of the present example, a two-dimensional array is displayed wherein a category icon array 100 in which a plurality of category icons are arrayed in a horizontal row and an item icon array 200 in which a plurality of item icons are arrayed in a vertical column intersect with each other at a substantially central portion of the screen.

The seven different category icons described hereinabove are arrayed in the category icon array 100. In particular, referring to FIG. 3, an icon 41 formed from a pattern of a tool box is the category icon of "setting"; an icon 42 including characters of "HDD" is the category icon of "HDD" as a content storage medium; an icon 43 formed from a pattern of a film is the category icon of "video"; an icon 44 including a pattern of a steel tower is the category icon of "terrestrial digital broadcasting"; an icon 45 including the characters of "BS" is the category icon of "BS digital broadcasting"; an icon 46 including the characters of "CS" is the category icon of "CS digital broadcasting"; and an icon 47 including a horizontally directed arrow mark is the category ion of "external input".

As seen from FIG. 3, in the present embodiment, the category icon array 100 is displayed horizontally a little on the higher side than the center in the vertical direction of the screen 19D of the monitor display unit 19. Further, one of the seven category icons 41 to 47 is normally selected, and the selected category icon is emphasized by displaying the same a little greater than the other category icons so as to inform the user of which one of the category icons is currently selected. In the example of FIG. 3, the category icon 43 of "video" is the selected category icon. Below the selected category icon, the title name of the category represented by the category icon is displayed as seen in FIG. 3.

In this instance, in the present embodiment, the graphical user interface display screen displays such that, as seen in FIG. 3, the seven different category icons are normally displayed on the screen while the item icon array 200 is displayed with regard only to the category icon being selected from among the seven category icons.

Accordingly, the initial menu of the graphical user interface in the present embodiment is formed from an icon array wherein the category icon array 100 and the item icon array 200 intersect in a cross shape with each other.

The item icon array 200 includes a plurality of item icons representing a plurality of items belonging to the category corresponding to the selected category icon. In the example of FIG. 3, since the "video" category icon 43 is selected, item icons 51, 52 and 53 belonging to the "video" category icon 43 are displayed in a vertical column as the item icon array 200.

It is to be noted that, while, in FIG. 3, no item icon is shown above the item icon array 200, this is because the number of items which belong to the category of "video" is small, but where the number of items is great, item icons are arrayed also above the category icon array 100 in the vertical direction. Further, as hereinafter described, also when the item icon to be selected changes, item icons appear also above the category icon array 100.

Further, where the number of items in a lower hierarchy of a category icon is great like the category icons 44 to 46 of the broadcasting media hereinafter described and the category icon of the external input, it is difficult, from the size of the display screen of the monitor display unit 19, to display all of items of the lower hierarchy of a selected category at a time on the screen 19D. Therefore, those item icons which are displayed as the item icon array 200 on the screen 19D are only part of the items of the selected category.

The graphical user interface screen in the present embodiment is an on-screen display screen and is displayed in an overlapping and translucent relationship on the front face of an image of an image content displayed on the screen 19D. In particular, the graphical user interface screen is displayed in such a display manner that, when a broadcasting program is being viewed on the broadcasting reception apparatus or when an image picked up by a camera is being reproduced, the image can be observed translucently through the graphical user interface screen.

It is to be noted that an entire region of the category icon array 100 and the item icon array 200 surrounded by dotted lines in FIG. 3 may be colored so as to facilitate distinction in appearance from the background region of the screen 19D or the brightness of the content image may be adjusted so as to make it easy to watch the graphical user interface. Naturally, only the category icons or item icons may be displayed without taking such measures as coloring or adjustment of the brightness.

Further, in the present example, the category icon array 100 in the initial menu screen of the graphical user interface screen does not move in the vertical direction of the screen 19D but is displayed fixedly at a position, for example, a little higher than from the center of the screen 19D in the vertical direction as shown in FIG. 3. Further, in the present embodiment, the region in which a selected category icon is displayed is an intersecting region 100C at which the category icon array 100 and the item icon array 200 intersect with each other, and also the intersecting region 100C is fixed on the screen 19D. As described hereinabove, below the category icon positioned in the intersecting region 100C, the category title name of the category icon is displayed.

If the user operates the leftward or rightward direction indicating operation button of the remote controller transmitter 23 to change the selected category icon to another category icon, then the plural category icons in the category icon array 100 move in the entire array thereof in the leftward or rightward direction in response to the leftward or rightward instruction of the user to change the selected category icon displayed in the intersecting region 100C.

The control section 1 recognizes the category icon displayed in the intersecting region 100C thereby to recognize the category selected by the user.

Also the item icon array 200 does not move in the horizontal direction similarly, but is displayed fixedly at a position, for example, a little leftwardly of the center in the horizontal direction as seen in FIG. 3. However, the plural item icons in the item icon array 200 can be moved in the upward or downward direction in response to an instruction of the upward or downward direction of the user issued through the upward or downward direction indicating operation button of the remote controller transmitter 23 serving as the operation inputting section.

As described above, since the display position in the vertical direction of the category icon array 100 in which the plural category icons 41 to 47 are arrayed in a row in the horizontal direction is fixed and the display position in the horizontal direction of the item icon array 200 in which a plurality of item icons are arrayed in a column in the vertical direction is fixed, the intersecting region 100C between the category icon array 100 and the item icon array 200 is fixed at a position obliquely leftwardly upwards with respect to the center of the display screen 19D.

Further, in the present embodiment, the region 200C immediately below the intersecting region 100C is determined as a region of an item icon selected by the user from among a plurality of item icons in the item icon array 200. In other words, in the present embodiment, the control section 1 recognizes the item icon displayed in the item icon array 200 immediately below the intersecting region 100C as a selected item icon (the selected item icon is hereinafter referred to as noticed item icon) thereby to recognize the selected item.

It is to be noted that, since the items are laid out and arrayed in such a manner as described above on the graphical user interface, in the present embodiment, the noticed region 200C is positioned substantially at the center of the screen 19D. In order to make it possible to distinguish the noticed item icon displayed in the noticed region 200C from the other item icons, the noticed item icon in the present embodiment is surrounded by a quadrangular framework 200MK colored in a conspicuous color such as, for example, yellow so that it is displayed emphatically.

It is to be noted that the method of emphatic display is not limited to the method wherein the noticed item icon is surrounded by the quadrangular framework 200MK but a different method may be used. For example, similarly as in the case of the category icons, the noticed item icon may be displayed in a color different from the other item icons or displayed in a greater size than that of the other item icons or else may be displayed flickering.

As described above, in the present embodiment, the category icon displayed in the intersecting region 100C at a fixed position is determined as a selected category icon, and the item icon displayed in the noticed region 200C immediately below the intersecting region 100C is determined as a noticed item icon.

Therefore, in the present embodiment, a category selection operation by a user is an operation of moving the category icon array 100 in a horizontal direction so that a category icon corresponding to a desired category is displayed in the intersecting region 100C, and an operation of a determination button for category selection or the like is not required. This is because, when the selected category is positioned in the intersecting region 100C, the item icon array 200 representing a plurality of items belonging to the selected category appears automatically.

Accordingly, the user can select a category only by issuing an instruction of the leftward or rightward direction, and such an instruction operation as is performed on a personal computer such as a clicking operation of an icon displayed fixedly on a screen by means of a mouse is unnecessary. Therefore, even if the user is unfamiliar to a personal computer, the user can perform a selection operation readily.

It is to be noted that, while the category icons are moved leftwardly or rightwardly, they may all be displayed in the same color and with the same size, and when the leftward or rightward movement is stopped to position one of the category icons at the intersecting region 100C finally, the color or the size of the category icon may be changed so as to display the category icon emphatically.

Further, as the change of the color, such a factor as the luminosity, saturation or hue of the category icon may be changed or the color may be changed by flickering display. Since the category icon positioned in the intersecting region 100C is displayed in a different displaying manner from that of the other category icons, the user can select a category readily.

Furthermore, it is possible to hold, when the category icons are moving in the leftward or rightward direction and none of the category icons is positioned in the intersecting region 100C, the item icon array 200 from being displayed and display, when one of the category icons is positioned finally in the intersecting region 100C, the item icon array 200 such that it extends in a projecting manner in the upward and downward direction from the intersecting region 100C.

The user can recognize those items which belong to the category displayed in the intersecting region 100C only by operating the category icons to scroll leftwardly or rightwardly. Further, the user can recognize the category from a plurality of items displayed in a projecting extending fashion.

It is to be noted that it is possible to display, if an instruction of the leftward or rightward direction is issued through the remote controller transmitter 23 while the item icon array 200 is displayed, the extended item icon array 200 in a contracting fashion toward the intersecting region 100C.

On the other hand, the selection operation of an item in a lower hierarchy of the selected category is an operation of moving the item icon array 200 in the vertical direction until an item icon corresponding to a desired item is displayed in the noticed region 200C.

In particular, the item icons in the item icon array 200 are moved in the vertical direction of the screen 19D in response to an instruction of the upward or downward direction of the user issued through the upward or downward direction instruction operation button of the remote controller transmitter 23, whereupon the item icon positioned in the noticed region 200C immediately below the intersecting region 100C changes. Then, if the user operates the "determination" button of the remote controller transmitter 23 while the item icon of a desired item is positioned in the noticed region 200C, then the control section 1 of the broadcasting reception apparatus erases the graphical user interface and establishes a state wherein processing of the item is to be executed.

However, when items of a lower hierarchy with respect to the item icon positioned in the noticed region 200C are defined, the items of the lower hierarchy are displayed on the screen 19D in response to an operation of the "determination button".

Figure 4:
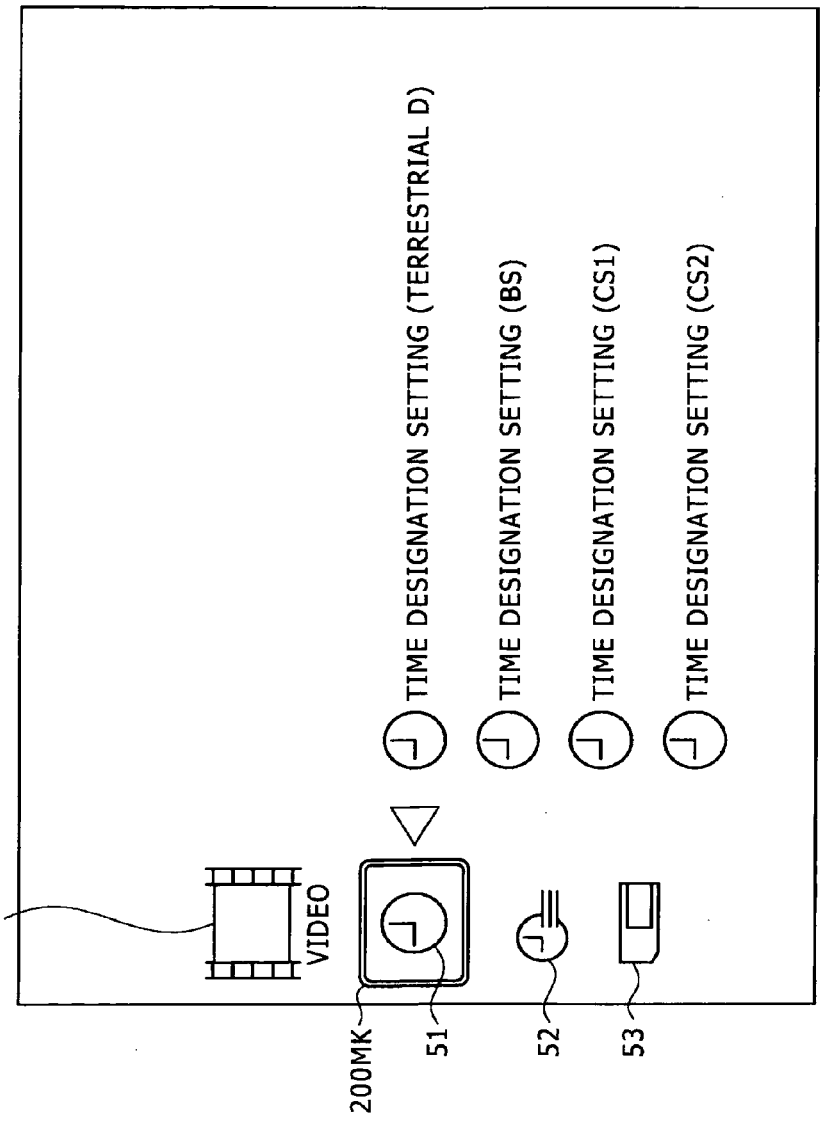

Since, with respect to the item "recording reservation" in the example of FIG. 3, items of a lower hierarchy are defined, if the "determination" button of the remote controller transmitter 23 is operated on the screen of FIG. 3, then the graphical user interface screen changes to such a screen as shown in FIG. 4.

Referring to FIG. 4, in the example shown, the category icon array disappears from the screen 19D only leaving the category icon being selected, and the display position of the item icon array moves to the left end of the screen 19D to leave out the space on the right side with respect to the item icon array. Then, in the left out space, a plurality of item icons in the lower hierarchy are displayed in an upward and downward array and explanation information regarding the substance of the items corresponding to the item icons is displayed. At this time, explanation information regarding all of the item icons of the lower hierarchy is displayed as seen in FIG. 4.

Then, the quadrangular framework 200MK which emphatically displays the noticed item moves to the position of one of the item icons of the lower hierarchy. Accordingly, the user can selectively determine a desired lower hierarchy item icon by operating the upward or downward direction indicating button and then operating the "determination" button of the remote controller transmitter 23. It is to be noted that any lower hierarchy item may include a further lower hierarchy.

In the present embodiment, in order to select an item icon in the item icon array 200, the user operates the upward or downward direction indicating operation button of the remote controller transmitter 23 to move a plurality of item icons in the vertical direction of the screen 19D to search for the item icon of a desired item.

Figure 7:
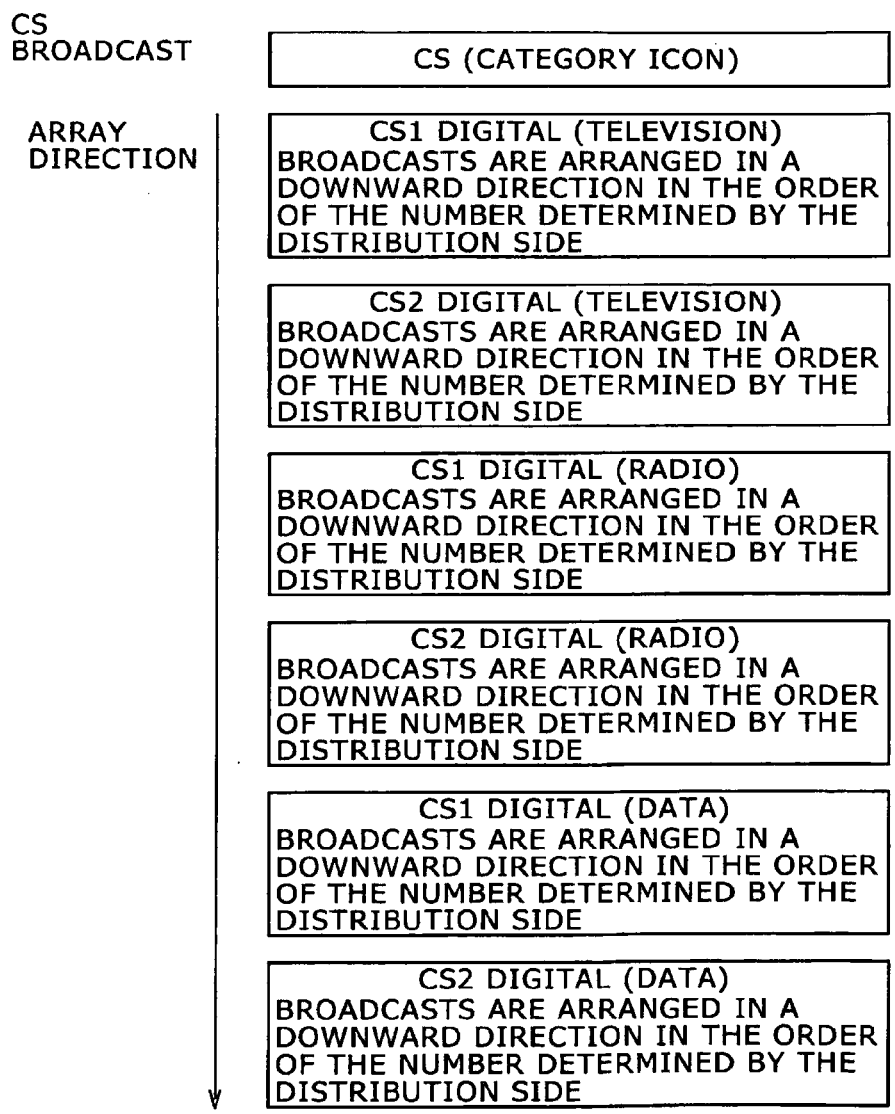

It is to be noted that the arrays of the item icons of the channel items immediately below the category icons 44 to 46 are such as shown in FIGS. 5 to 7, respectively. In particular, while the channels of the broadcasting media are grouped for each broadcasting object as described hereinabove, the array order of the group units and the array order of the channels in the groups in the present embodiment are determined in the following manner.

FIG. 5 illustrates the array order with regard to the terrestrial broadcasting category. Referring to FIG. 5, where the downward direction from a location immediately below the terrestrial broadcasting category icon 44 is determined as an array direction, the groups are arrayed in the order of the terrestrial analog broadcasting, terrestrial digital (television) and terrestrial digital (data).

Then, in the group of the terrestrial analog broadcasting, the belonging channels are arrayed in the order of registered channel numbers in the array direction. The array order is the registered number order but not the physical number order nor the displayed number order.

Meanwhile, in the group of the terrestrial digital broadcasting (television), the belonging channels are arrayed in the order of the numbers determined in the distribution order in the array direction. Also in the terrestrial digital broadcasting (data) group, the channels are arrayed in the order of the numbers determined in the distribution order in the array direction.

FIG. 6 illustrates the array order with regard to the BS broadcasting category. Referring to FIG. 6, where the downward direction from a location immediately below the terrestrial broadcasting category icon 44 is determined as an array direction, the groups are arrayed in the order of the BS digital (television), BS digital (radio) and BS digital (data).

Then, in each of the groups of the BS digital (television), BS digital (radio) and BS digital (data), the belonging channels are arrayed in the order of the numbers determined in the distribution order in the array direction.

FIG. 7 illustrates the array order with regard to the CS broadcasting category. Referring to FIG. 7, where the downward direction from a location immediately below the terrestrial broadcasting category icon 44 is determined as an array direction, the groups are arrayed in the order of the CS1 digital (television), CS2 digital (television), CS1 digital (radio), CS2 digital (radio), CS1 digital (data) and CS2 digital (data).

Then, in each of the groups of the CS1 digital (television), CS2 digital (television), CS1 digital (radio), CS2 digital (radio), CS1 digital (data) and CS2 digital (data), the belonging channels are arrayed in the order of the numbers determined in the distribution order in the array direction.

Figure 8:
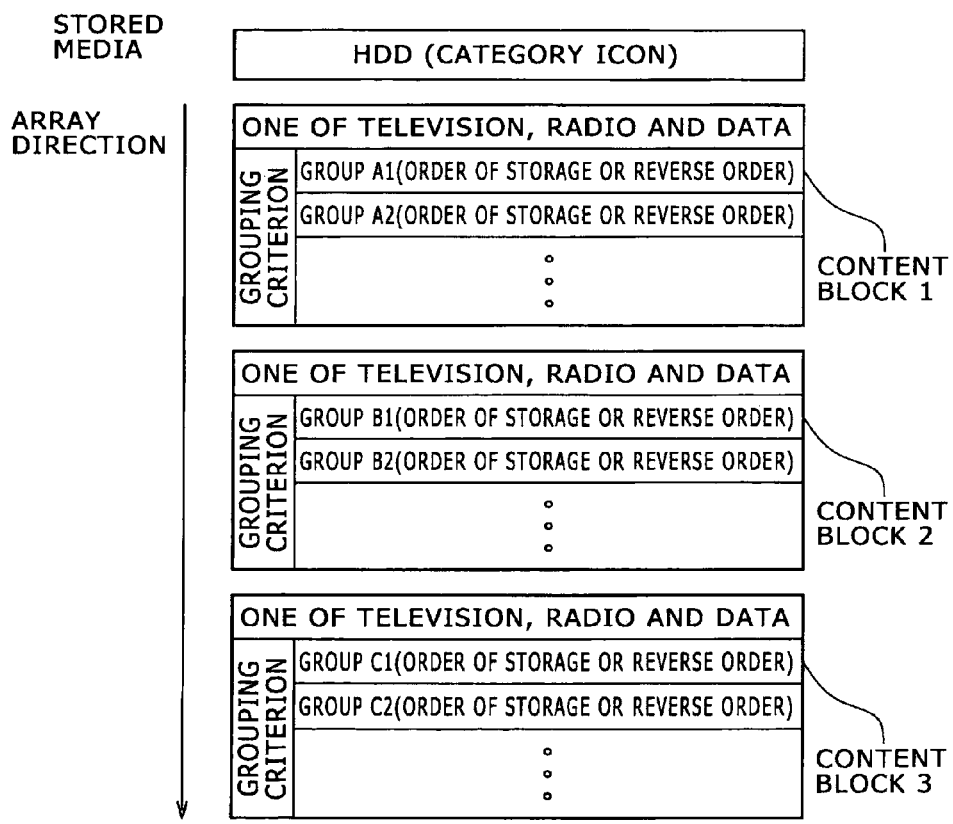

FIG. 8 illustrates an array order in the content storage medium category of "HDD". Referring to FIG. 8, a content block 1, a content block 2 and a content block 3 are arrayed in order in an array direction which is a downward direction from a position immediately below the "HDD" category icon.

The content block 1 includes one of television broadcast contents, radio broadcast contents and data broadcast contents set by selective setting of the user. The content block 2 includes another one of the other two broadcast contents except the broadcast content set as the content block 1 from among the television broadcast contents, radio broadcast contents and data broadcast contents. Further, the content block 3 includes the remaining broadcast contents other than the broadcast contents set as the content block 1 and the content block 2.

In each of the content blocks 1, 2 and 3, broadcast program contents are divided into a plurality of groups in accordance with a grouping criterion set by the user as hereinafter described. Then, each group includes one or a plurality of broadcast program contents, and the array order of a plurality broadcast program contents in each group is the order of storage into the content data storage section 33 or the reverse order as hereinafter described.

Incidentally, the items represented by the item icons belonging to the category of a broadcasting medium in the present embodiment are function completion items composed of utility items and broadcasting channel items as shown in FIG. 2.

Here, the utility items shown above the category titles of the broadcasting media in FIG. 2 are EPG items, and preferably, they can be selected simply on the graphical user interface so that they can be referred to immediately upon channel selection.

Therefore, in the present embodiment, when one of the category icons 44 to 46 of the broadcasting media is selected, the channel item icons in the item icon array 200 are moved upwardly or downwardly one by one, but when the noticed item icon is to be selected with regard to a channel item, the item icons of the utility items above the category icons 44 to 46 are not moved in the upward or downward direction while only the item icons of the function completion items below the category icons 44 to 46 are moved in the upward or downward direction. This similarly applies to the item icon array with regard to the category icon 47.

It is to be noted that, if an instruction to select one of the items above the channel item (uppermost channel item) immediately below any of the category icons 44 to 46 in FIGS. 5 to 7 is issued by the user, then the selection instruction becomes a selection instruction of a utility item, and an item icon of an EPG item is displayed as the noticed item icon in the noticed region 200C so that it can be selected.

Then, if the selection instruction operation range of the user changes to the range which indicates item icons of channel items from an item icon in the EPG item range, then the icons of those channel items positioned higher in the array direction than the item icon of the channel item displayed in the noticed region 200C as the noticed item icon successively disappear from the screen display as the item icons of the channel items move downwardly in the array direction.

Figure 9:
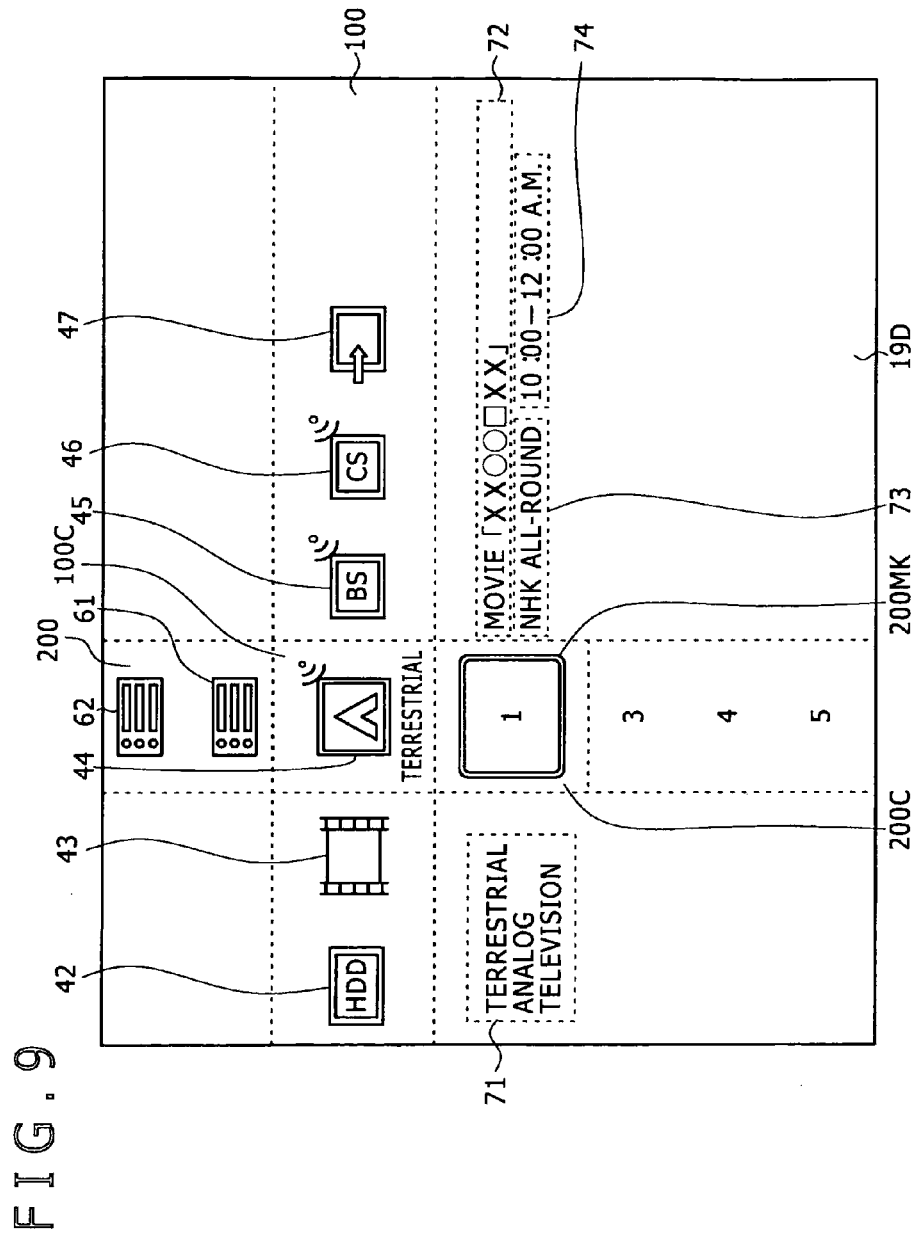
FIGS. 9 to 12 are schematic views showing different examples of the graphical user interface screen in the broadcast reception apparatus of FIG. 1.

FIG. 9 shows an initial menu screen of the graphical user interface screen where the "terrestrial broadcasting" category icon 44 is the selected category.

As seen in FIG. 9, on the screen shown, each of the broadcasting channel items is represented by an icon composed of a channel number. In the example of FIG. 9, the broadcasting channel of the channel number "1" is surrounded by the quadrangular framework 200MK and displayed in the noticed region 200C, thereby indicating that the channel "1" is selected.

Further, above the category icon, item icons 61 and 62 where the EPG function is a utility item are displayed. In the example shown in FIG. 9, the item icon 61 represents the EPG function for the terrestrial analog television broadcasting, and the item icon 62 represents the EPG function for the terrestrial digital television broadcasting.

Then, in the present embodiment, if the selected category icon changes in response to an operation of the user, then it is checked whether or not those item icons which belong to the newly selected category icon are in a grouped state (including a blocked state). If it is decided that the item icons are in a grouped state, then the group name displaying place 71 is provided as a display item on the left side of the noticed item icon, and the block name and the group name to which the item represented by the noticed item icon belongs are displayed in the group name displaying place 71.

As seen in the example of FIG. 9, on the graphical user interface screen on which one of the category icons of the broadcasting media is selected, when the noticed item icon is an item icon of a channel item, the "terrestrial analog television" is displayed in the group name displaying place 71 on the left side of the noticed item icon of the noticed region 200C.

Then, an explanation display which explains the item represented by the noticed item icon is provided on the right side of the noticed item icon similarly as in FIGS. 3 and 4. Here, on the graphical user interface screen of FIG. 9 on which one of the category icons of the broadcasting media is selected, when the noticed item icon is an item icon of a channel item, in the present example, explanation information for two lines is displayed on the right side of the noticed item icon of the noticed region 200C.

A place 72 of the higher line of the explanation information in the two lines is set as a program name displaying place, in which a broadcasting program name of the channel of the noticed item icon is displayed. Meanwhile, a place 73 and another place 74 of the lower side line are used as a broadcasting station name displaying place and a broadcasting time displaying place in which a broadcasting station name and the broadcasting time (starting time and ending time) of the channel of the noticed item icon are displayed, respectively.

Figure 10:
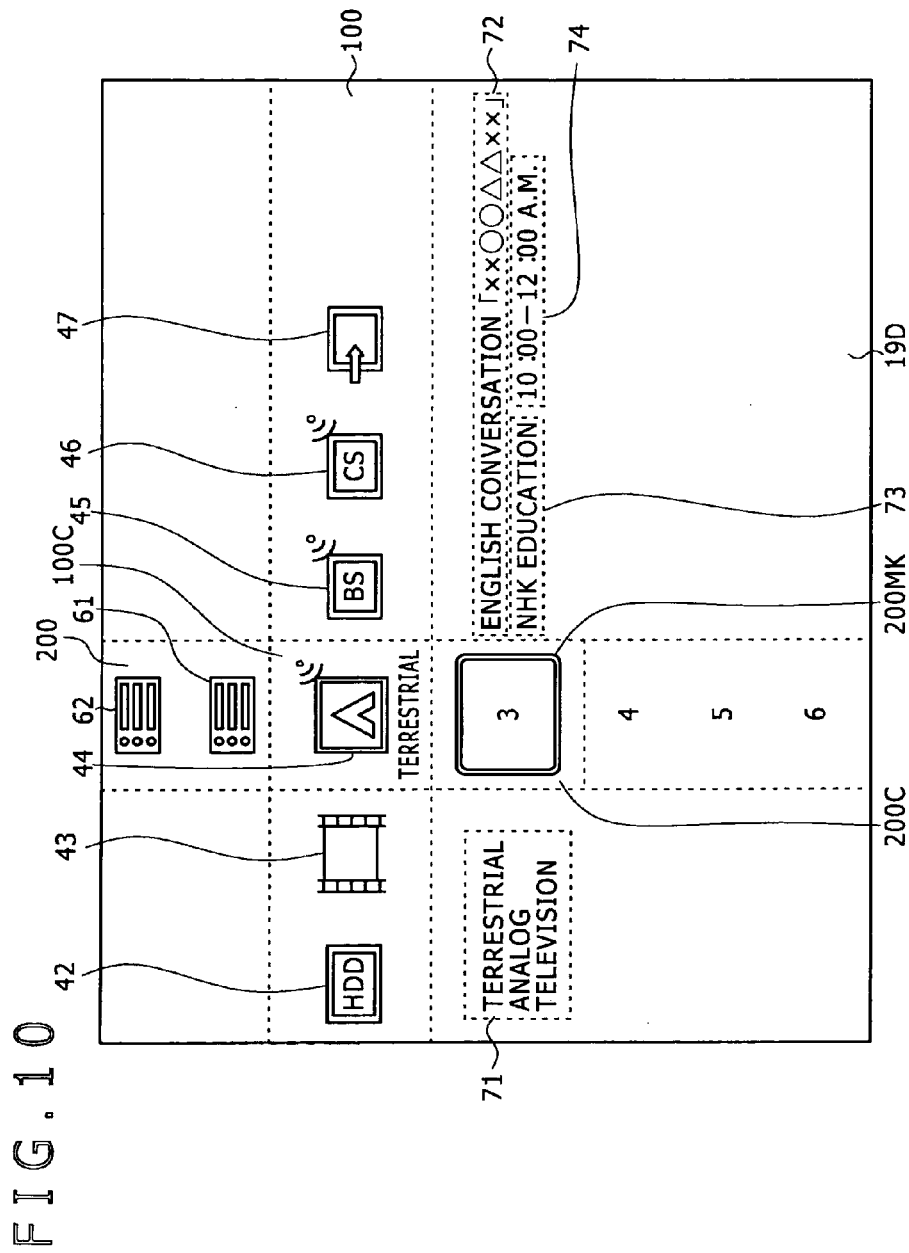

Then, if, in the state of FIG. 9, the user operates the downward direction indicating operation button of the upward and downward direction indicating operation buttons of the remote controller transmitter 23 in order to select a channel at a downward portion in the array direction of the channel numbers, then the display substance of the screen changes as seen in FIG. 10. In particular, the noticed item icon of the noticed region 200C changes to that of the channel "3" of the terrestrial analog television broadcasting and the item icon of the channel "1" disappears from the screen. At this time, the item icons 61 and 62 of the EPG items which are utility items are displayed without changing the position thereof on the screen 19D.

Further, if an item icon of a channel item at a lower portion in the channel array direction is selected, then the screen changes similarly.

Figure 11:
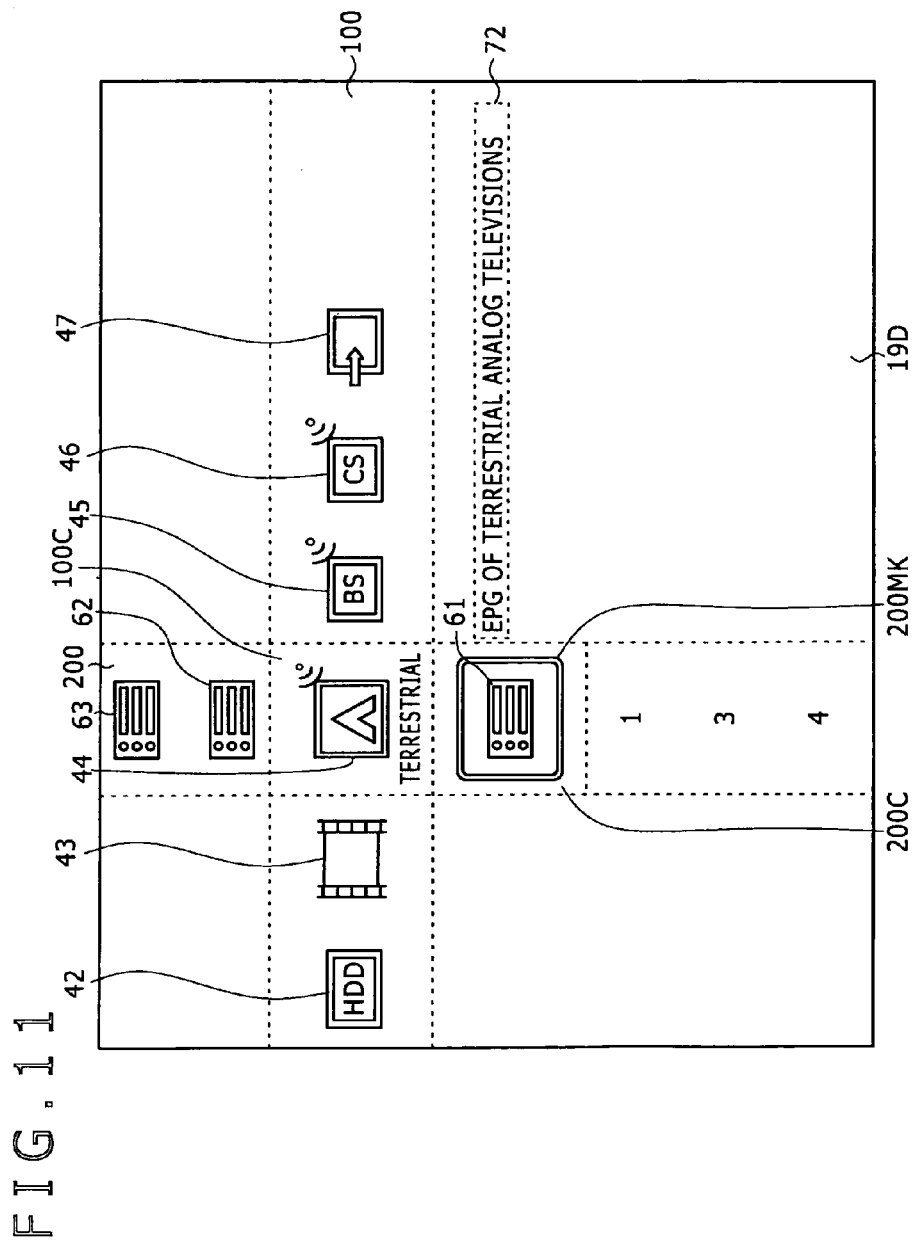

On the contrary, if the user operates the upward direction indicating operation button of the upward and downward direction indicating operation buttons of the remote controller transmitter 23 in order to select a channel at an upper portion in the array direction of the channel numbers, then the display substance of the screen changes as seen in FIG. 11. In particular, at this time, the noticed item icon of the noticed region 200C changes to an item icon of an EPG function of the terrestrial analog television broadcasting, and explanation of this is displayed in a program name displaying place 72.

Here, if the "determination" button is depressed in this state, then in the broadcasting reception apparatus, corresponding EPG data is read out from the display data storage section 29 to produce EPG display data. Then, the graphical user interface is erased and the produced and selectively determined EPG screen is displayed on the screen 19D of the monitor display unit 19.

Figure 12:
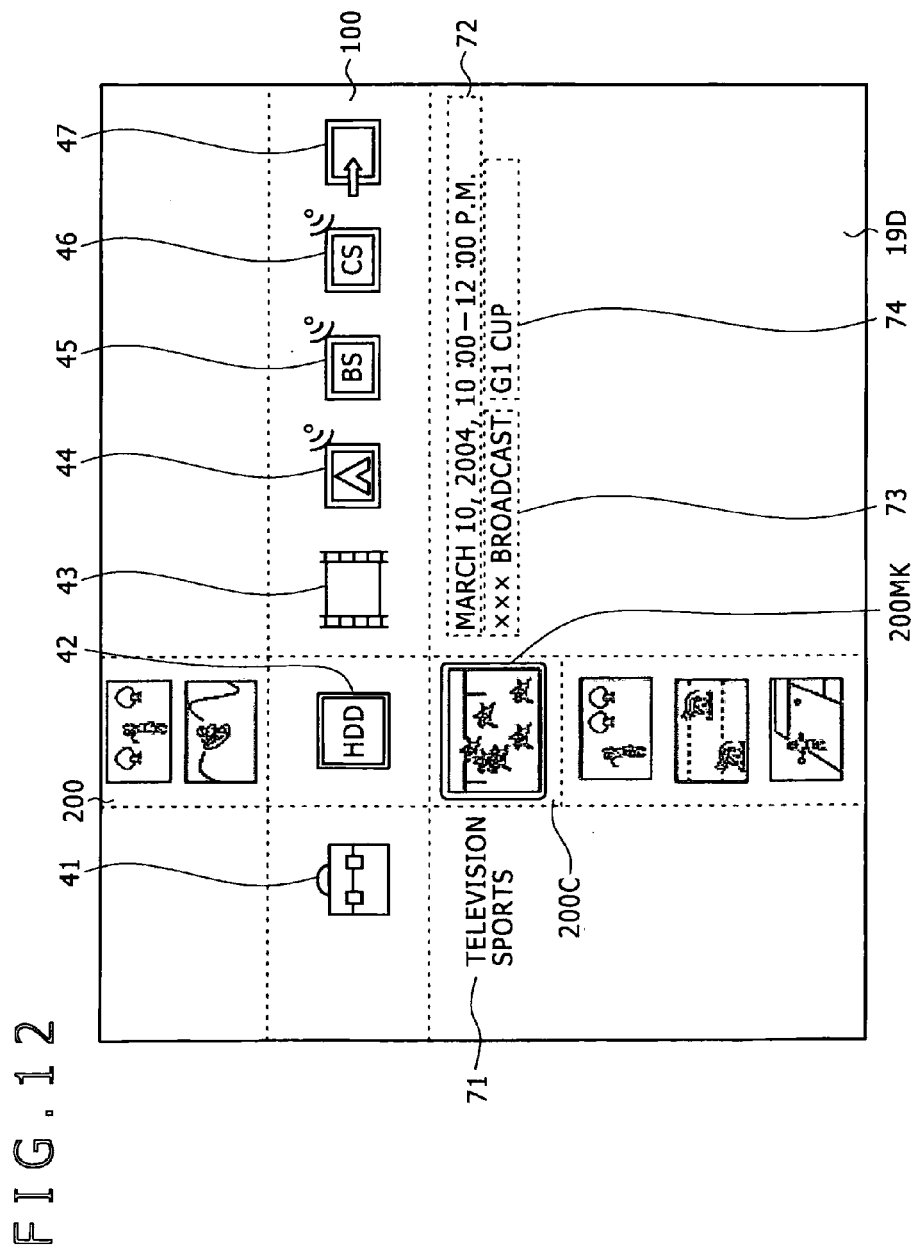

FIG. 12 shows an initial menu screen of the graphical user interface screen where the "HDD" category icon 42 is a selected category.

In this instance, thumbnail images of broadcasting program contents stored in the content data storage section 33 are read out from the display data storage section 29 in accordance with information of the array order of the item icons shown in FIG. 8 of the content management section 34 and displayed in the array order as item icons. In particular, part of the stored broadcasting program content data, for example, thumbnail images of the title images, are displayed in an array in the vertical direction as an item icon array 200 as seen in FIG. 12.

Then, a noticed thumbnail image as the noticed item icon in the noticed region 200C is displayed emphatically, in the example of FIG. 12, in a greater size than the other thumbnail images. Similarly as in the case of FIG. 11, three displaying places 72, 73 and 74 are provided in two lines on the right side of the noticed thumbnail image. In the example of FIG. 12, the storage year, month, day and time at which the noticed thumbnail image was stored into the content data storage section 33 is displayed in the displaying place 72. In the displaying place 73, the name of the broadcasting station from which the noticed thumbnail image was provided is displayed, and in the displaying place 74, the title name of the broadcasting program content of the noticed thumbnail image is displayed.

A group name displaying place 71 is provided on the left side of the noticed thumbnail image of the noticed region 200C similarly as described hereinabove. In the example of FIG. 12, that the program is a television broadcasting program (television broadcasting block) and that the genre is selected as the grouping criterion and the group of broadcasting program contents represented by the noticed thumbnail image is "sports" are displayed as a group name display.

In the description given with reference to FIG. 11, since item icons of an object of selection are items of channel selection of broadcasting media and selection is performed from among items of channel selection in the category of broadcasting media, the items are grouped into the television broadcasts, radio broadcasts and data broadcasts in advance as described above. However, in the case of the storage medium of the category "HDD", since the grouping can be set by the user as seen in FIG. 12, the group name displayed in the group name displaying place 71 is that provided in accordance with the grouping criterion set by the user.

As described hereinabove, the groups of broadcasting program contents stored in the content data storage section 33 and the array order of the item icons (thumbnail images) on the graphical user interface are set by the user and stored in and managed by the content management section 34.

Processing action for the setting of stored content groups is described with reference to FIGS. 13 to 15A to 15E.

Figure 13:
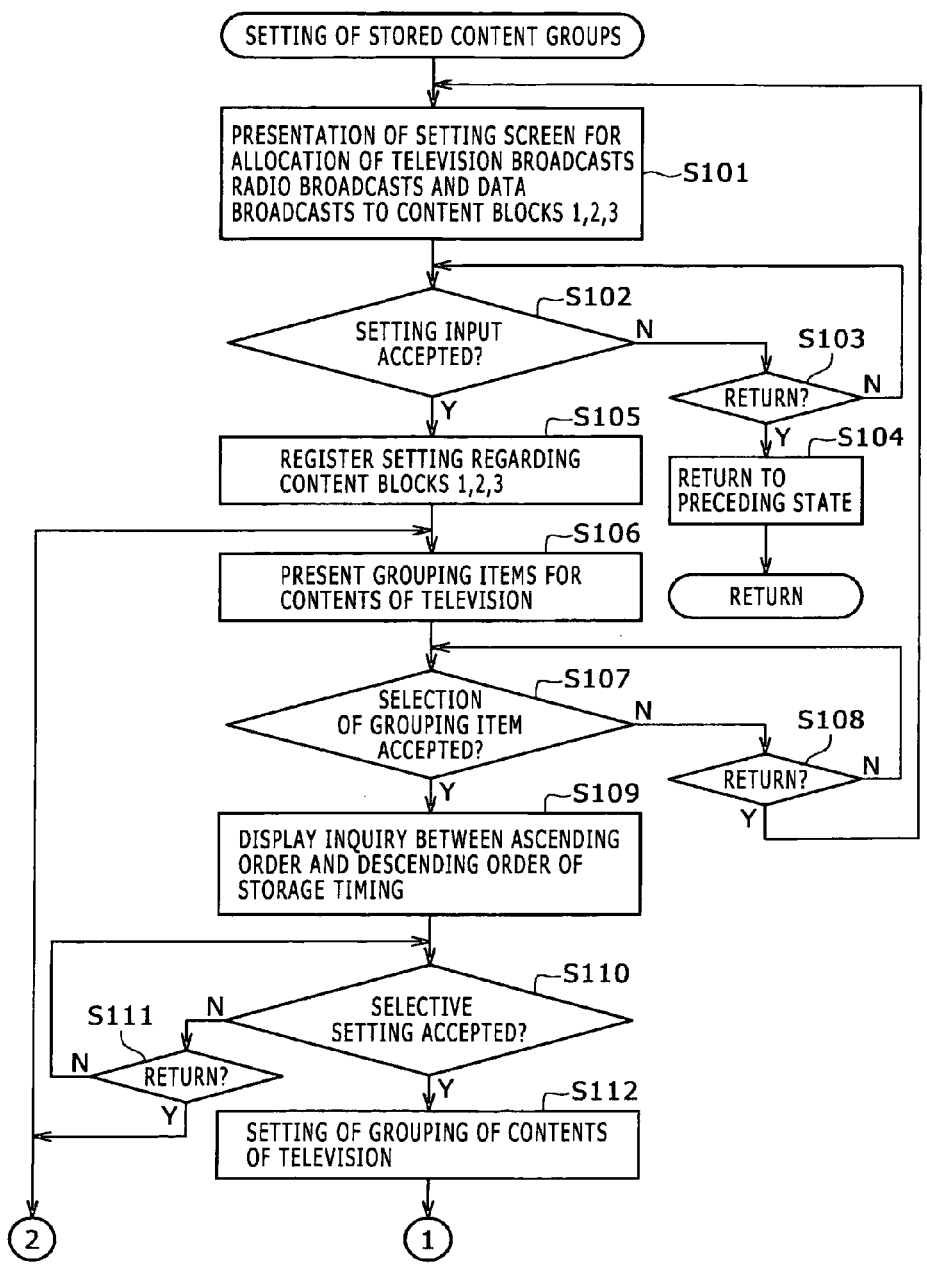
FIGS. 13 and 14 are flow charts illustrating a group setting processing action of the broadcast reception apparatus of FIG. 1.
Figure 14:
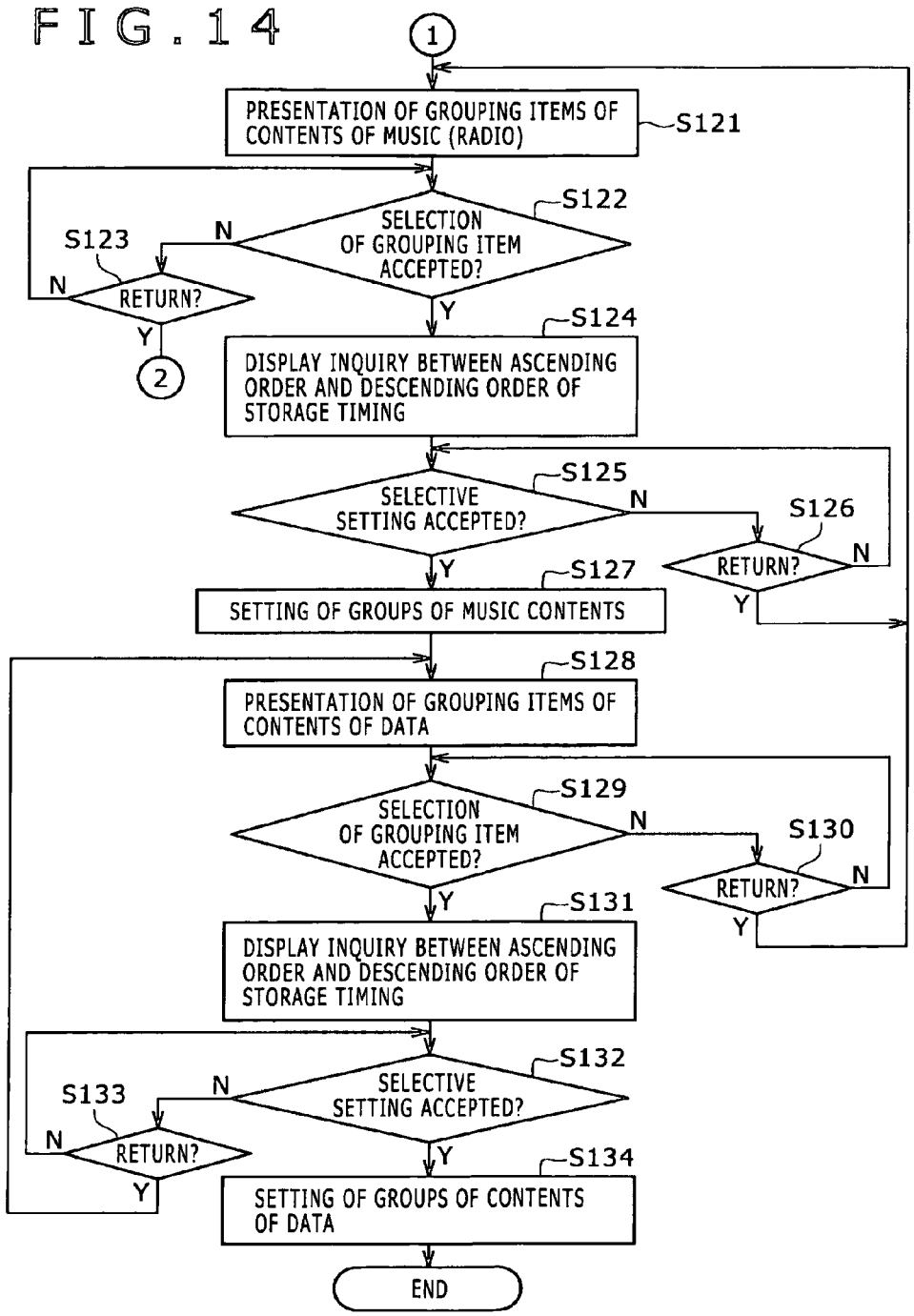
Figure 15:
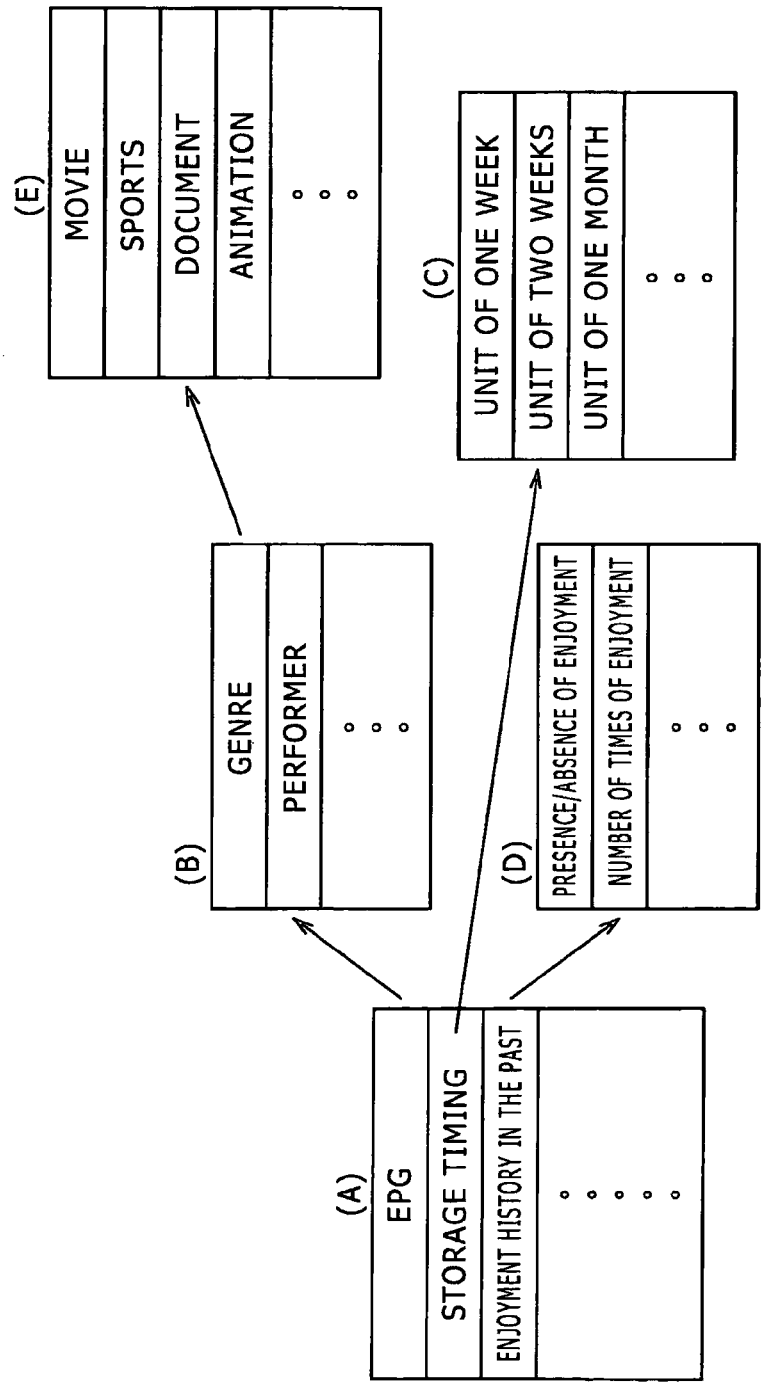
FIGS. 15A to 15E are diagrammatic views illustrating the group setting processing action illustrated in FIGS. 13 and 14.

FIGS. 13 and 14 are flow charts illustrating the processing action. The processing routine for the setting of stored content groups is started from FIG. 13 when the item icon "setting of HDD" is selected in the category 41 of "setting".

First, the control section 1 displays a setting screen for selective allocation of the television broadcasts, radio broadcasts and data broadcasts to the content blocks 1, 2 and 3 on the screen 19D of the display unit 19 (step S101). Then, the control section 1 discriminates through the remote controller transmitter 23 whether or not a setting instruction is accepted (step S102). If it is decided that no acceptance of a setting input is detected, then it is decided whether or not the "return" button of the remote controller transmitter 23 is operated (step S103). If it is decided that the "return" button is not operated, then the processing returns to step S102. However, if it is decided that the "return" button is operated, then the control section 1 restores the graphical user interface screen which is that before the "setting of HHD" is selected (step S104), thereby quitting the present processing routine.

On the other hand, if it is decided at step S102 that a setting input regarding the content blocks 1, 2 and 3 is accepted, then the control section 1 stores the substance of the setting input regarding the content blocks 1, 2 and 3 into the content management section 34 (step S105).

Then, in the present example, the control section 1 displays grouping criterion items regarding stored television broadcast program contents with regard to the contents blocks set as the television broadcasts, for example, in such a manner as seen in FIGS. 15A to 15E on the screen 19D to present the grouping criterion items to the user (step S106).

The user would selectively input an item to be used as the grouping criterion from within the selection screen of the grouping criterion items (item icons) or operate the "return" button of the remote controller transmitter 23.

Then, the control section 1 decides whether or not a selective input of the user is accepted with regard to the grouping criterion items (step S107). If it is decided that no such selective input is accepted, then the control section 1 decides whether or not the "return" button of the remote controller transmitter 23 is operated (step S108). If it is decided that the "return" button is not operated, then the processing returns to step S107. However, if it is decided that the "return" button is operated, then the processing returns to step S101 so that the processes at the steps beginning with step S101 are repeated.

If it is decided at step S107 that a selection input of a grouping criterion item is accepted, then the control section 1 displays an inquiry screen regarding whether the array order of the broadcasting program contents in the group is the storage order into the content data storage section 33 or the reverse order on the screen 19D (step S109). Then, the control section 1 decides whether or not a selective setting input regarding the array order is accepted (step S110).

If it is decided at step S110 that a selective setting input regarding the array order is not accepted, then the control section 1 decides whether or not the "return" button of the remote controller transmitter 23 is operated (step S111). If it is decided that the "return" button is not operated, then the processing returns to step S110, but if it is decided that the "return" button is operated, then the processing returns to step S106.

On the other hand, if it is decided at step S110 that a selective setting input regarding the array order is accepted, then the control section 1 sends information of the item selectively set as the grouping criterion to the content management section 34 and instructs the content management section 34 to execute a grouping process regarding the television broadcasting program contents (step S112).

An example of the grouping criterion items displayed on the screen 19D and presented to the user at step S106 is illustrated in FIG. 15A. Referring to FIG. 15A, as the grouping criterion items, for example, that which depends upon the EPG, that which depends upon the storage timing, that which depends upon the history of enjoyment in the past and so forth are presented to the user.

For example, if the grouping criterion item which depends upon the EPG is selected as the grouping criterion on the screen of FIG. 15A by the user, then items of the lower hierarchy are displayed on the screen 19D. In particular, items which are used as a criterion in grouping depending upon EPG data, for example, such grouping criterion items as "genre", "performers" and so forth, are displayed as the lower hierarchy items on the screen 19D as seen in FIG. 15B.

If, for example, "genre" is selected as the grouping criterion by the user on the screen 19D of FIG. 15B, then, for example, such sub items of the genre as seen in FIG. 15E are displayed on the screen 19D. The user can select, from among the sub items of the genre, a plurality of sub items which the user wants to use for grouping.

For example, if "movie", "sports" and "document" are selected as the sub items by the user, then the content management section 34 refers to the genre information of the EPG data stored in the content data storage section 33 to divide the broadcasting program contents stored in the content data storage section 33 into groups of those which belong to the selected sub items of "movie", "sports" and "document" and a different group of those which belong to the "other genres". In other words, the broadcasting program contents stored in the content data storage section 33 are divided into a plurality of groups including the groups of the items selected by the user and the group of the other items.

On the other hand, if "performer" is selected as the grouping criterion by the user in FIG. 15B, then though not shown, a table list of performers is displayed as sub items of performers on the screen 19D and presented to the user. The user can select performers which the user wants to group from within the table list of performers. Also in this instance, the content management section 34 refers to performer information of the EPG data stored in the content data storage section 33 to divide the broadcasting program contents stored in the content data storage section 33 into groups of those which belong to the names of a plurality of selected performers and a different group of those which belong to the "other genre".

Further, if the grouping criterion item which depends upon the storage timing is selected as the grouping criterion by the user, then items relating to the storing timing such as a unit of one week, a unit of two weeks, a unit of one month and so forth are displayed as grouping criterion items of the lower hierarchy on the screen 19D as seen in FIG. 15C.

If an item relating to the storage timing is selected by the user, then the content management section 34 refers to the information of the storage timing (information of the year, month, day and time) stored in the content data storage section 33 to divide the broadcasting program contents stored in the content data storage section 33 into a plurality of groups in accordance with the selected storing timings.

Further, if the grouping criterion item which depends upon the history of enjoyment in the past is selected as the grouping criterion by the user, then whether or not the broadcasting program content has been enjoyed even once in the past, that is, presence or absence of enjoyment, the number of times of enjoyment and so forth are displayed as grouping criterion items of the lower hierarchy on the screen 19D as seen in FIG. 15D.

If the user selects, for example, "presence or absence of enjoyment" as the grouping criterion item, then the content management section 34 divides the broadcasting program contents stored in the content data storage section 33 into a group of those which have been enjoyed at least once in the past and another group of those which have not been enjoyed as yet in the past.

On the other hand, for example, if "number of times of enjoyment" is selected as the grouping criterion item by the user, then the content management section 34 divides the broadcasting program contents stored in the content data storage section 33 into a plurality of groups depending upon the number of times of enjoyment such as a group of those which have not been enjoyed as yet, another group of those which have been enjoyed once, a further group of those which have been enjoyed twice and so forth.

It is to be noted that, in all of the cases described above, the array order of the broadcasting program contents in each group is the order of timings of storage into the content data storage section 33 or the reverse order based on a selective input of the user responsive to the inquiry at step S109.

In summary, the content management section 34 performs grouping for the content block of television from among the contents blocks 1, 2 and 3 in accordance with the grouping criterion selected by the user in such a manner as described above. Then, the information of the array order is stored, in the present example, into the content data storage section 33.

Next to step S112, the processing advances to step S121 of FIG. 14, at which, regarding the content block set as the radio broadcast, a grouping criterion item regarding the stored radio broadcasting program contents is displayed on the screen 19D and presented to the user in a similar manner as in the case of FIGS. 15A to 15E. However, the sub items of the genre in this instance are, for example, classic, pops, Latin, movie music and so forth and are different from those in the case of FIGS. 15a to 15e.

The control section 1 decides whether or not a selection input from the user is accepted with regard to the grouping criterion item (step S122). If it is decided that no selection input is accepted, then the control section 1 decides whether or not the "return" button of the remote controller transmitter 23 is operated (step S123). If it is decided that the "return" button is not operated, then the processing returns to step S121, but if the "return" button is operated, then the processing returns to step S106 so that the processes at the steps beginning with step S106 are repeated.

If it is decided at step S122 that a selection input regarding the grouping criterion item is accepted, then the control section 1 displays an inquiry screen regarding whether the array order of the broadcasting program contents in the group is the storage order into the content data storage section 33 or the reverse order on the display screen 19D (step S124). Then, the control section 1 decides whether or not a selective setting input regarding the array order is accepted (step S125).

If it is decided at step S125 that a selective setting input regarding the array order is not accepted, then the control section 1 decides whether or not the "return" button of the remote controller transmitter 23 is operated (step S126). If it is decided that the "return" button is not operated, then the processing returns to step S125, but if the "return" button is operated, then the processing returns to step S121.

Further, if it is decided at step S125 that a selective setting input regarding the array order is accepted, then the control section 1 sends information of the item selectively set as the grouping criterion to the content management section 34 and issues an instruction to the content management section 34 to execute a grouping process for the radio broadcasting program contents (step S127).

Next to step S127, the processing advances to step S128, at which the control section 1 displays the grouping criterion item regarding the stored data broadcasting program contents with regard to the content block set for the data broadcasting on the screen 19D to present the grouping criterion item to the user similarly as in the case of FIGS. 15A to 15E. However, for example, the sub items of the genre in this instance are amusement, politics and economics; travel and so forth and are different from those in the case of the television shown in FIGS. 15A to 15E.

The control section 1 decides whether or not a selection input from the user is accepted with regard to the grouping criterion items (step S129). If it is decided that no such selection input is accepted, then the control section 1 decides whether or not the "return" button of the remote controller transmitter 23 is operated (step S130). If it is decided that the "return" button is not operated, then the processing returns to step S129, but if it is decided that the "return" button is operated, then the processing returns to step S121 so that the processes at the steps beginning with step S121 are repeated.

If it is decided at step S129 that a selective input of the grouping criterion items is accepted, then the control section 1 displays an inquiry screen regarding whether the array order of the broadcasting program contents in the group is the storage order into the content data storage section 33 or the reverse order on the display screen 19D (step S131). Then, the control section 1 decides whether or not a selective setting input regarding the array order is accepted (step S132).

If it is decided at step S132 that a selective setting input regarding the array order is not accepted, then the control section 1 decides whether or not the "return" button of the remote controller transmitter 23 is operated (step S133). If it is decided that the "return" button is not operated, then the processing advances to step S132, but if it is decided that the "return button" is operated, then the processing returns to step S128.

On the other hand, if it is decided at step S132 that a selective setting input regarding the array order is accepted, then the control section 1 sends information of the item selectively set as the grouping criterion to the content management section 34 and issues an instruction to the content management section 34 to execute a grouping process regarding the data broadcasting program contents (step S134). Then, the present processing routine is ended.

Scrolling Process

Further, in the present embodiment, taking it into consideration that the number of stored broadcasting program content items of the storage medium or the number of channel items of the broadcasting media is great, a scrolling search can be performed upon selection of an item icon in the item icon array 200.

Although the operation button for such a scrolling search may be provided separately on the remote controller transmitter 23, in the present embodiment, it is determined that a scrolling starting operation is performed when the upward direction indicating operation button or the downward direction indicating operation button of the upward and downward direction indicating operation buttons of the remote controller transmitter 23 is kept depressed for more than a fixed period of time, and while the upward direction indicating operation button or the downward direction indicating operation button is kept depressed, the scrolling is continued.

Then, in the present embodiment, while the scrolling continues, the scrolling speed increases gradually. Further, in the present embodiment, the display substance of the graphical user interface screen changes in response to the scrolling speed so that the user can perform the search more readily. A manner of such change of the screen 19D when a scrolling operation of the item icons is performed is described with reference to FIGS. 16 to 19.

Figure 16:
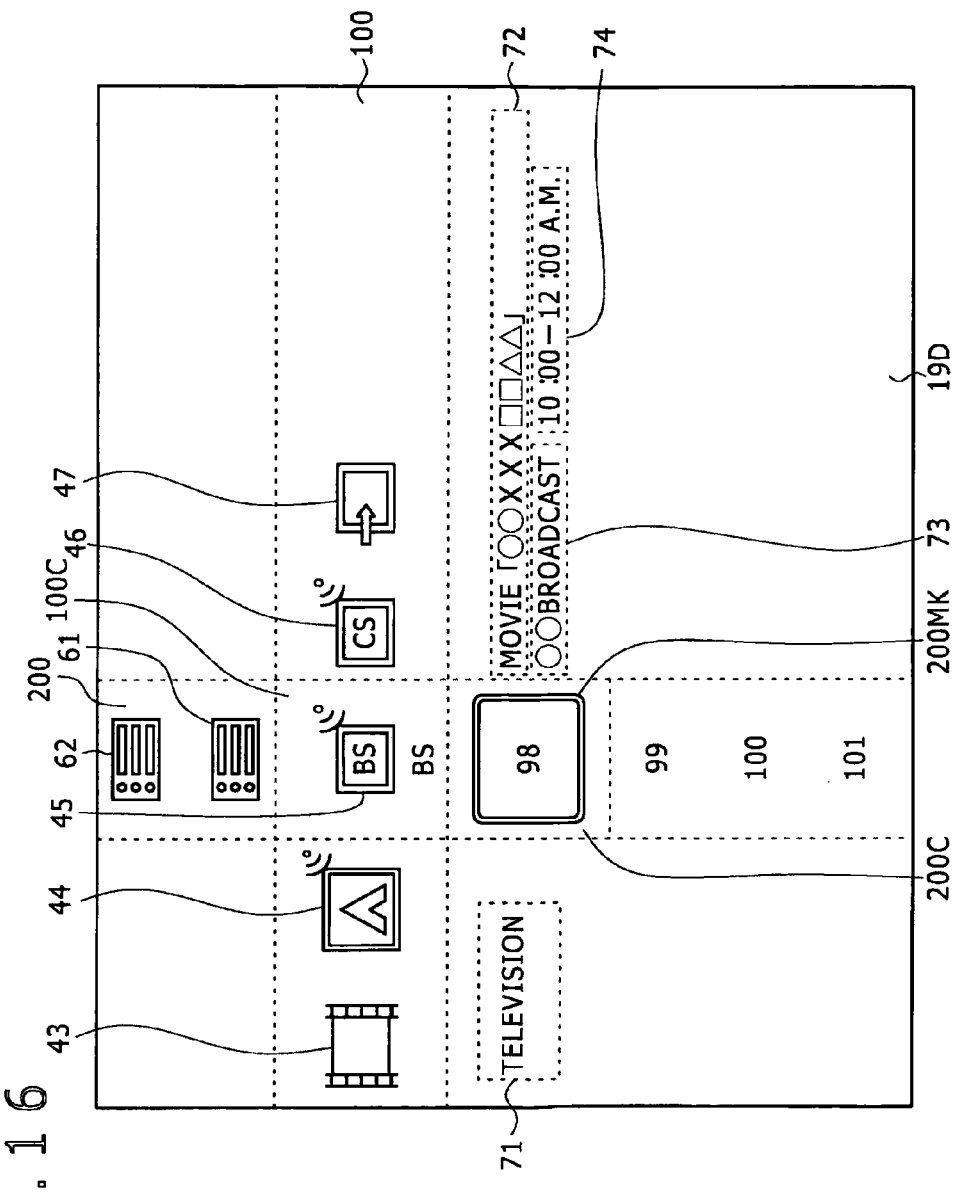
FIG. 16 is a schematic view showing a different example of the graphical user interface screen in the broadcast reception apparatus of FIG. 1.

FIG. 16 illustrates a manner wherein, while the category icon 45 of the BS broadcasting media is selected, the item icon of the channel 98 of the television is selected as the noticed item icon. The display of FIG. 16 is similar to that of FIG. 9 described hereinabove but is different in that the broadcasting media change from the terrestrial broadcasting media to the BS broadcasting media.

Figure 17:
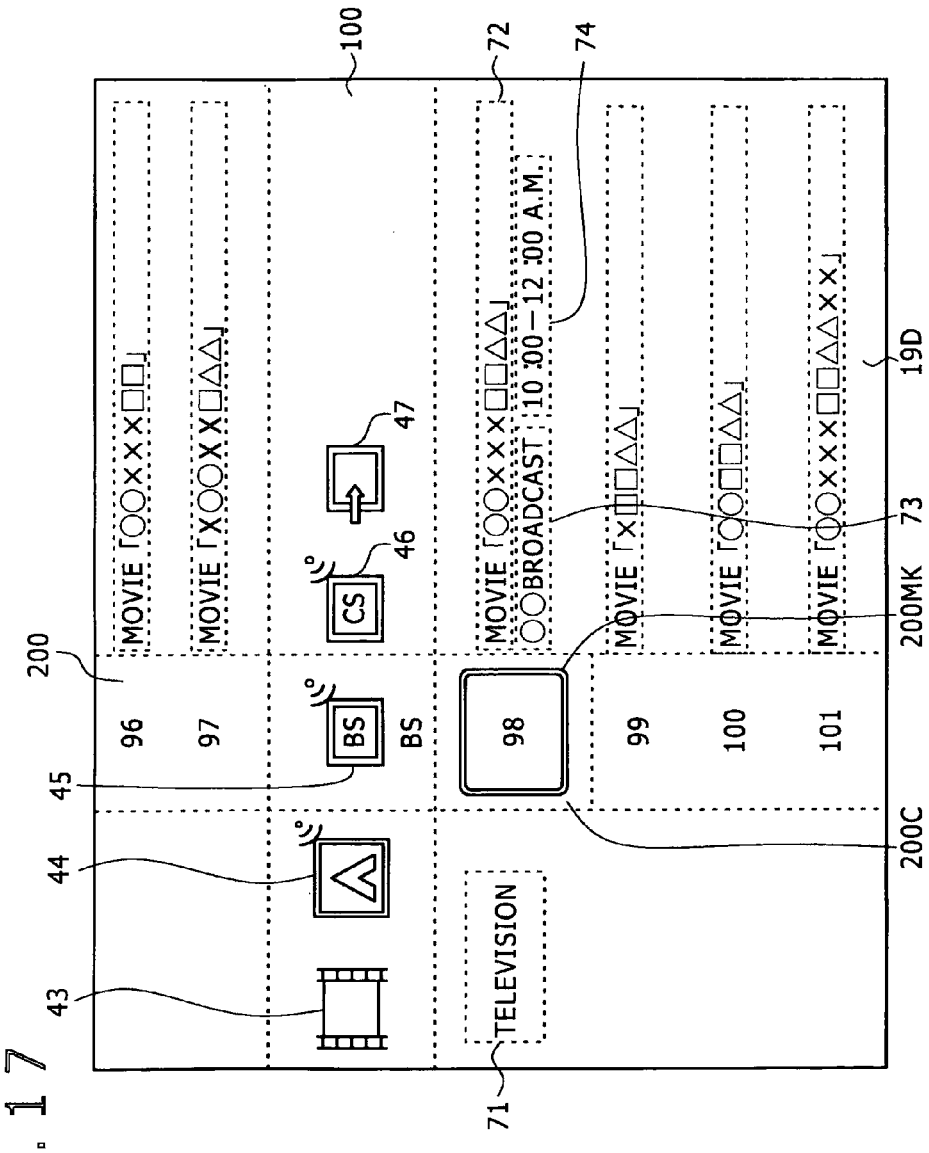
FIGS. 17 to 21 are schematic views showing different examples of the graphical user interface upon scrolling in the broadcast reception apparatus of FIG. 1.

If, in the state of FIG. 16, the user depresses, for example, the downward direction indicating operation button of the remote controller transmitter 23 for more than a fixed period of time to perform the scrolling starting operation, then the graphical user interface screen changes to such a manner as seen in FIG. 17.

In particular, on the original screen of FIG. 16, explanation of the selected channel is displayed on the right side only with regard to the noticed item icon of the noticed region 200C. However, in FIG. 17, explanation not only with regard to the noticed item icon of the noticed region 200C but also with regard to a plurality of channels preceding to and following the channel selected as the noticed item icon is displayed.

In particular, on the original screen of FIG. 16, although the channel numbers of a plurality of channels following the channel selected through the noticed item icon of the noticed region 200C are displayed in the item icon array 200, explanation of the program names of the channels and so forth is not displayed. However, such explanation is displayed on the screen of FIG. 17. However, also in this instance, the group name displaying place 71 is displayed only for the noticed item icon as seen in FIG. 17.

Further, on the original screen of FIG. 16, item icons of channel items preceding to the selected noticed item icon are not displayed above the category icon 45 because item icons of EPG items are displayed above the category icon 45 as described above. However, on the graphical user interface screen shown in FIG. 17 after the scrolling is started, the item icons of the EPG items disappear, and also item icons of channels preceding to the channel corresponding to the noticed item icon are displayed.

Consequently, the user can easily find out a desired channel item by scroll search.

However, in the present embodiment, although all of the program name displaying place 72, broadcasting station name displaying place 73 and broadcasting time displaying place 74 are displayed with regard to the noticed item icon as seen in FIG. 16, with regard to the item icons preceding to and following the noticed item icon, the substance is displayed only in some of the program name displaying place 72, broadcasting station name displaying place 73 and broadcasting time displaying place 74. In the example of FIG. 16, only a program name is displayed in the displaying place 72. In particular, in the present embodiment, also on the scrolling screen, explanation information regarding the noticed item icon is displayed emphatically and details are displayed. However, explanation information regarding the item icons other than the noticed item icon to be displayed simultaneously is limited to part of the explanation information regarding the noticed item icon.

The reason why such a displaying manner of explanation information as just described is adopted is that, even if a large number of types of information are provided for images moving at a high speed in the scrolling display, the information cannot be recognized readily and, if it is tried to display a large number of kinds of information, then each piece of information can be displayed only finely and cannot be recognized readily.

It is to be noted that, in the present embodiment, the explanation display is performed such that, where it is positioned on the right side of the noticed item icon, it is displayed densely or displayed in a different color from the other displays such as, for example, in bright yellow so that it can be distinguished from the other item icons displayed thinly, for example, in white characters. Further, it is common to all of the graphical user interface screens used in the present embodiment that a reproduction image of the background can be generally observed through the graphical user interface screen.

Figure 18:
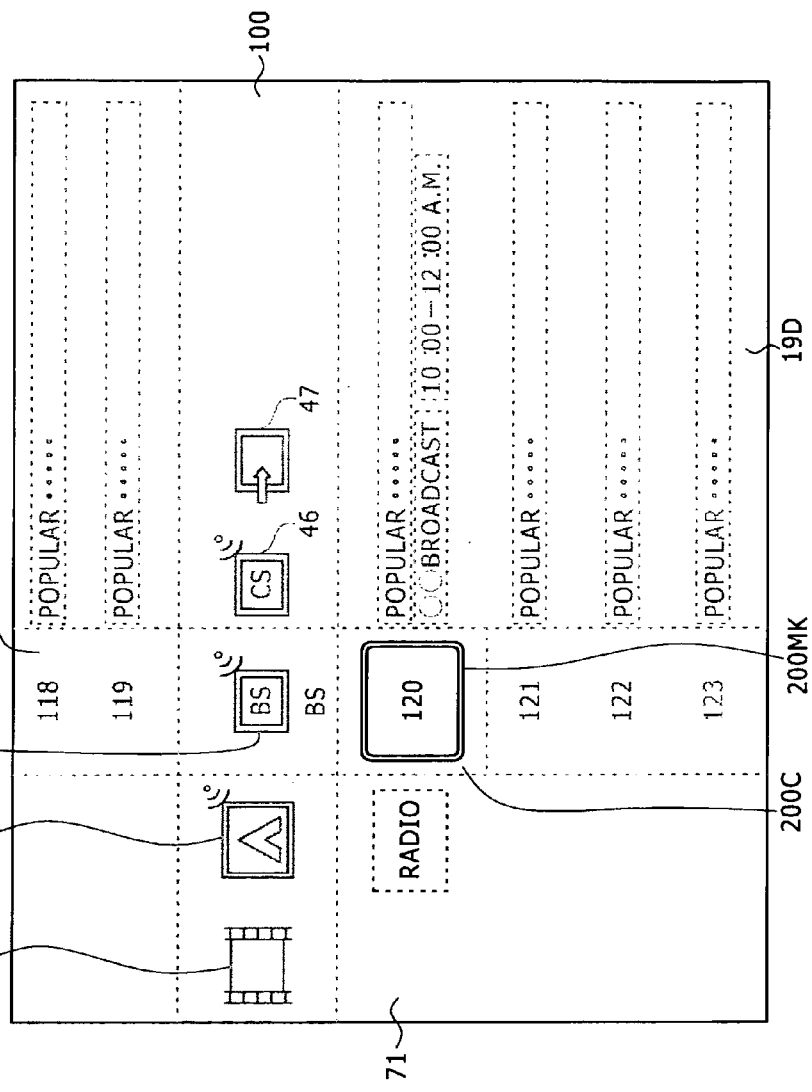

If the depression state of the downward direction indicating operation button of the remote controller transmitter 23 is further continued in this state, then the broadcasting reception apparatus decides that the scrolling is continued and gradually raises the scrolling speed. As the scrolling speed gradually rises, the item icon formed from a channel number surrounded by the quadrangular framework 200MK is displayed densely so as to be emphasized as shown in FIG. 18. However, the explanation displays are all displayed thinly similarly to the other item icons. At this time, only the explanation information of the noticed item icon may be kept densely or may be displayed more densely than the other explanation displays so that it can be noticed.

Figure 19:
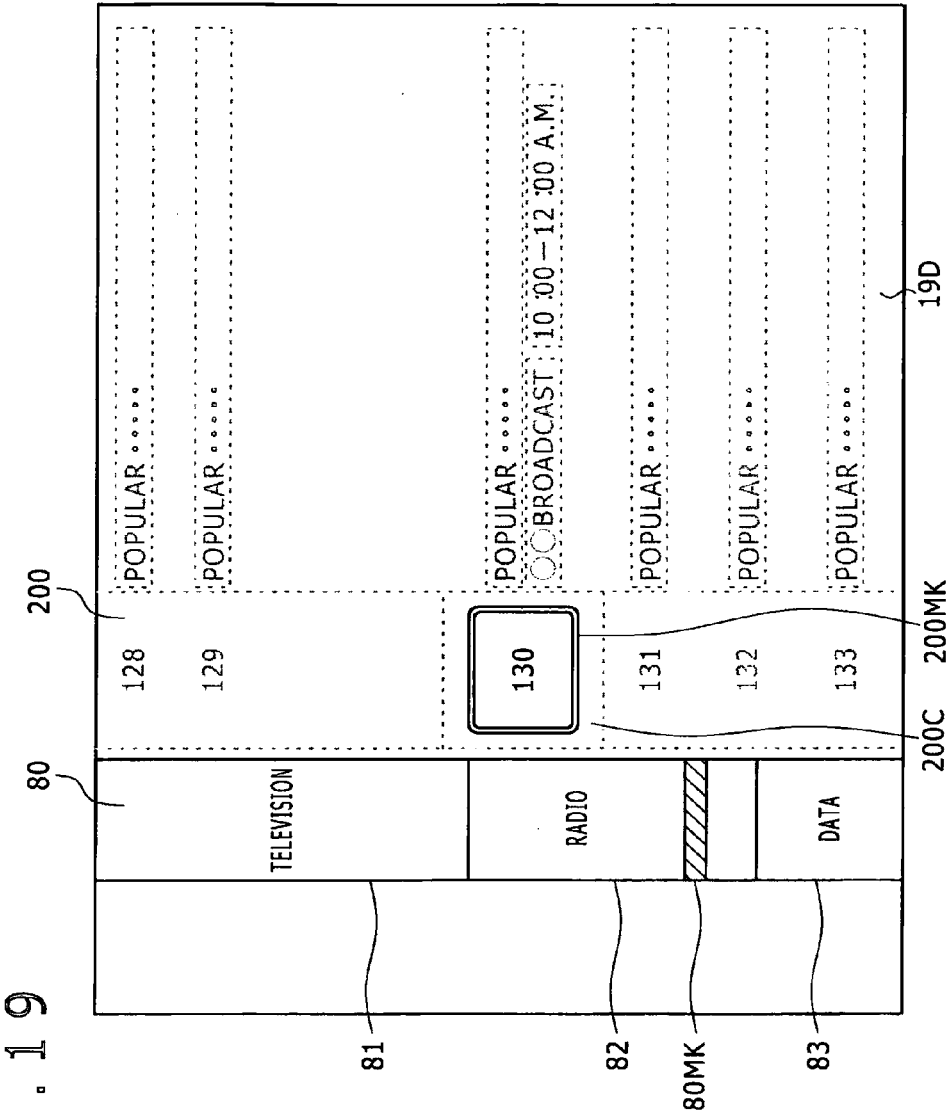

If the scrolling further continues until the scrolling speed exceeds a predetermined value, then a group bar 80 having a predetermined width in the horizontal direction and extending over the overall extent of the screen 19D in the vertical direction is displayed on the left side of the noticed item icon in the noticed region 200C which is surrounded by the quadrangular framework 200MK and displayed densely so as to be emphasized as shown in FIG. 19. Further, in the present example, the category icon array 100 is erased on the screen of FIG. 19. However, also on the screen of FIG. 19, the category icon array 100 may otherwise be kept displayed but thinly without being erased.

The group bar 80 is displayed so as to correspond to the array order of the channels of the individual broadcasting medium described hereinabove with reference to FIGS. 5 to 7. Thus, the group bar 80 is divided in the vertical direction in accordance with the set group such that the individual divided portions have lengths corresponding to the number of channels included in the groups. Since the example of FIG. 19 illustrates the group bar 80 of the BS broadcasting, the group bar 80 is divided into three regions of divisional regions 81, 82 and 83 in accordance with the grouping of FIG. 6, and the group name is displayed at the bar portion of each of the divisional regions 81, 82 and 83. Further, the group bar 80 displays a noticed item icon position display mark 80MK indicative of the group and the position of the channel in the group bar 80 represented by the noticed item icon.

The noticed item icon position display mark 80MK is displayed using a color which looks conspicuously to the user on the graphical user interface screen, for example, using bright yellow similarly to the quadrangular framework 200MK for emphatically displaying the noticed item icon.

Consequently, even if the scrolling speed becomes so high that the noticed item icon displayed on the screen and item icons preceding to and following the noticed item icon as well as the explanation displays of them cannot be observed well, it can be recognized readily from the position of the noticed item icon position display mark 80MK of the group bar 80 which channel position is being currently scrolled.

In the present embodiment, scrolling is possible not only upon selection of a channel item when the selected category icon is the category icon of any broadcasting medium but upon selection of an item icon belonging to all of the seven different category icons.

However, in the present embodiment, the selection for the array of item icons in the item icon array 200 is not of the ring type. In particular, after change of the selection of an item icon comes to the upper end or lower end of the item icon array, this cannot be performed any more in the same direction, but can be performed only in the reverse direction. Accordingly, also in the scrolling, after it comes to the upper or lower end of the array of item icons in the item icon array 200, it is stopped there. Therefore, where the number of items is small, even if the screen change to the scroll starting screen of FIG. 17 occurs, the scrolling may be stopped without changing to the screen of FIG. 18 or 19.

Naturally, however, the scrolling described above can be applied also where the upper end and the lower end of the item icon array are coupled to each other in the change of the selection of an item icon so as to allow ring-lie selection.

Selection of Stored Medium Contents

The description above is directed to a case wherein the item icons of an object of selection are items for channel selection of broadcasting media, and scrolling is performed for the items for channel selection of the category of the broadcasting medium. Therefore, the items are grouped into television broadcasts, radio broadcasts, data broadcasts and so forth as described above. However, as regards storage media of the category "HDD", since the grouping can be set by a user as described hereinabove, the group name displayed in the group name displaying place 71 conforms to that according to the grouping criterion set by the user.

In particular, if the "HDD" category icon is selected and, for example, a broadcasting program content of the group of television broadcast programs is selected as the noticed item in the noticed region 200C, then a thumbnail image of each of the broadcasting program contents is used as an item icon as shown in FIG. 12. Further, the thumbnail image in the noticed region 200C is displayed emphatically in a greater size than the other thumbnail images.

Figure 20:
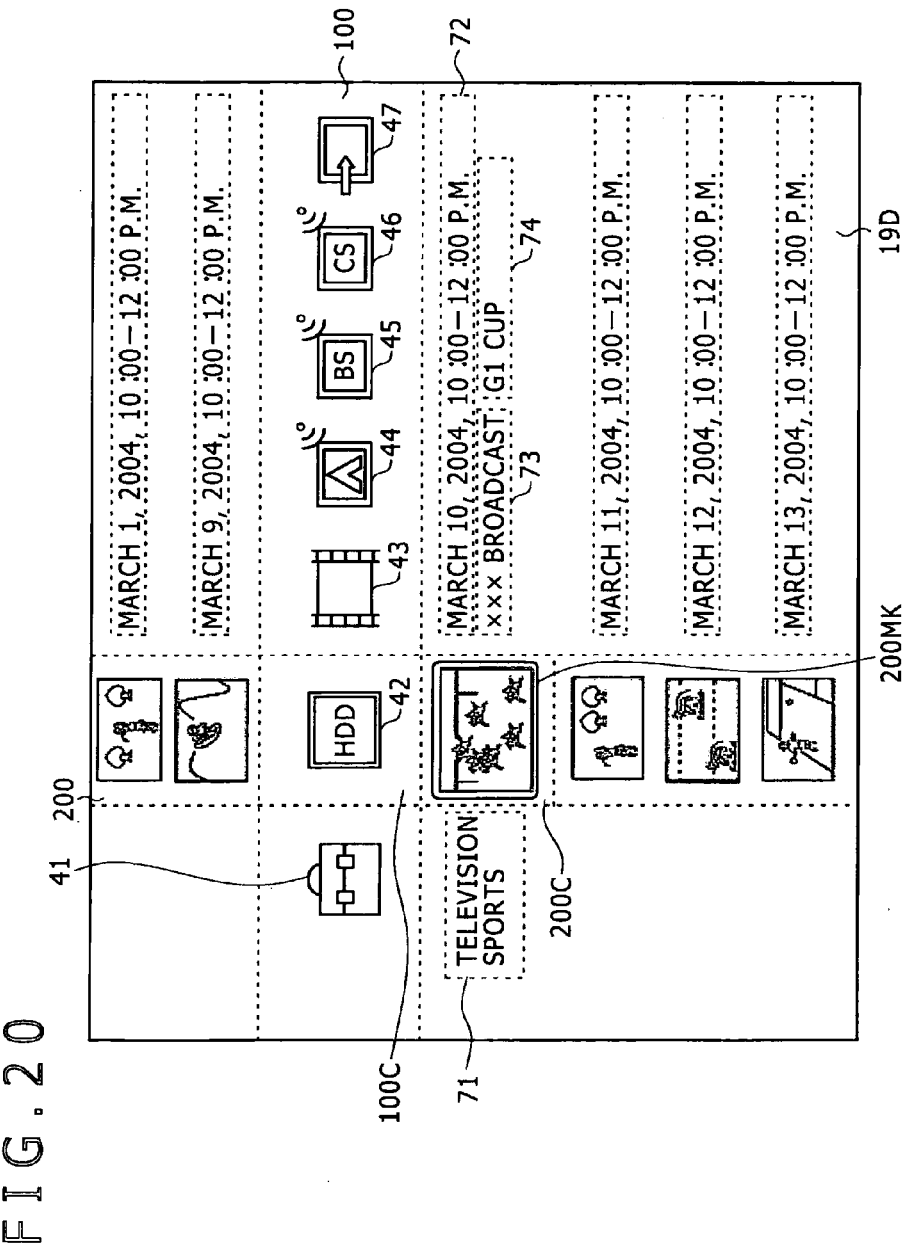

If the user issues a scrolling starting instruction through the remote controller transmitter 23 in the state of the screen of FIG. 12, then the graphical user interface screen of the screen 19D displays explanation information regarding not only the thumbnail image (hereinafter referred to as noticed thumbnail image) as the noticed item icon surrounded by the quadrangular framework 200MK in the noticed region 200C but also the thumbnail images of a plurality of broadcasting program contents preceding to and following the noticed thumbnail image similarly as in the case of FIG. 17. It is to be noted that, also in this instance, the group name displaying place 71 is displayed only for the noticed item thumbnail image as seen in FIG. 20.

Consequently, the user can easily find out a desired broadcasting program content item by the scrolling search.

Also in this instance, although, in the present embodiment, all of the program name displaying place 72, broadcasting station name displaying place 73 and broadcasting time displaying place 74 are displayed for the noticed thumbnail image in the noticed region 200C, for the thumbnail images of the other broadcasting program contents as the item icons preceding to and succeeding the noticed item icon, only explanation is displayed in some of the displaying place 72, displaying place 73 and displaying place 74, in the example shown, only a program name is displayed in the displaying place 72.

The reason why such a displaying manner of explanation information as just described is adopted is that, as described hereinabove, even if a large number of types of information are provided for images moving at a high speed in the scrolling display, the information cannot be recognized readily and, if it is tried to display a large number of kinds of information, then each piece of information can be displayed only finely and cannot be recognized readily.

It is to be noted that, also in the present example, the explanation display is performed such that, where it is positioned on the right side of the noticed thumbnail image, it is displayed densely or displayed in a different color from the other displays such as, for example, in bright yellow so that it can be distinguished from the other thumbnail images as item icons displayed thinly, for example, in white characters. Further, it is common to all of the graphical user interface screens used in the present embodiment that a reproduction image of the background can be generally observed through the graphical user interface screen.

If the depression state of the downward direction indicating operation button of the remote controller transmitter 23 is further continued in this state, then the broadcasting reception apparatus decides that the scrolling is continued and gradually raises the scrolling speed. As the scrolling speed gradually rises, the noticed thumbnail image in the noticed region 200C surrounded by the quadrangular framework 200MK is displayed densely so as to be emphasized. However, the explanation displays are all displayed thinly similarly to the other thumbnail images as item icons. At this time, only the explanation information of the noticed thumbnail image may be kept densely or may be displayed more densely than the other explanation displays so that it can be noticed.

Further, in the present embodiment, if the scrolling further continues until the scrolling speed exceeds a predetermined value, then two group bars 90A and 90B having a predetermined width in the horizontal direction and extending over the overall extent of the screen 19D in the vertical direction are displayed on the left side of the noticed thumbnail image in the noticed region 200C which is surrounded by the quadrangular framework 200MK and displayed densely so as to be emphasized.

The group bar 90A displays the substances of the groups corresponding to the content blocks 1, 2 and 3 while the group bar 90B displays the substance of the group in the content block including the noticed thumbnail image.

In particular, as described hereinabove with reference to FIG. 8, it is set by the user that the content blocks 1, 2 and 3 are coordinated individually with the broadcasting program media of "television", "radio" and "data" and what grouping is provided in each content block. Thus, the group bar 90A has three divisional regions 91A, 92A and 93A divided in the vertical direction with lengths conforming to the numbers of broadcasting program contents in the content blocks 1, 2 and 3 in accordance with the setting. Further, in each of the divisional regions 91A, 92A and 93A, the name of a broadcasting program medium set by the user, that is, one of "television", "radio" and "data" is displayed.

Figure 21:
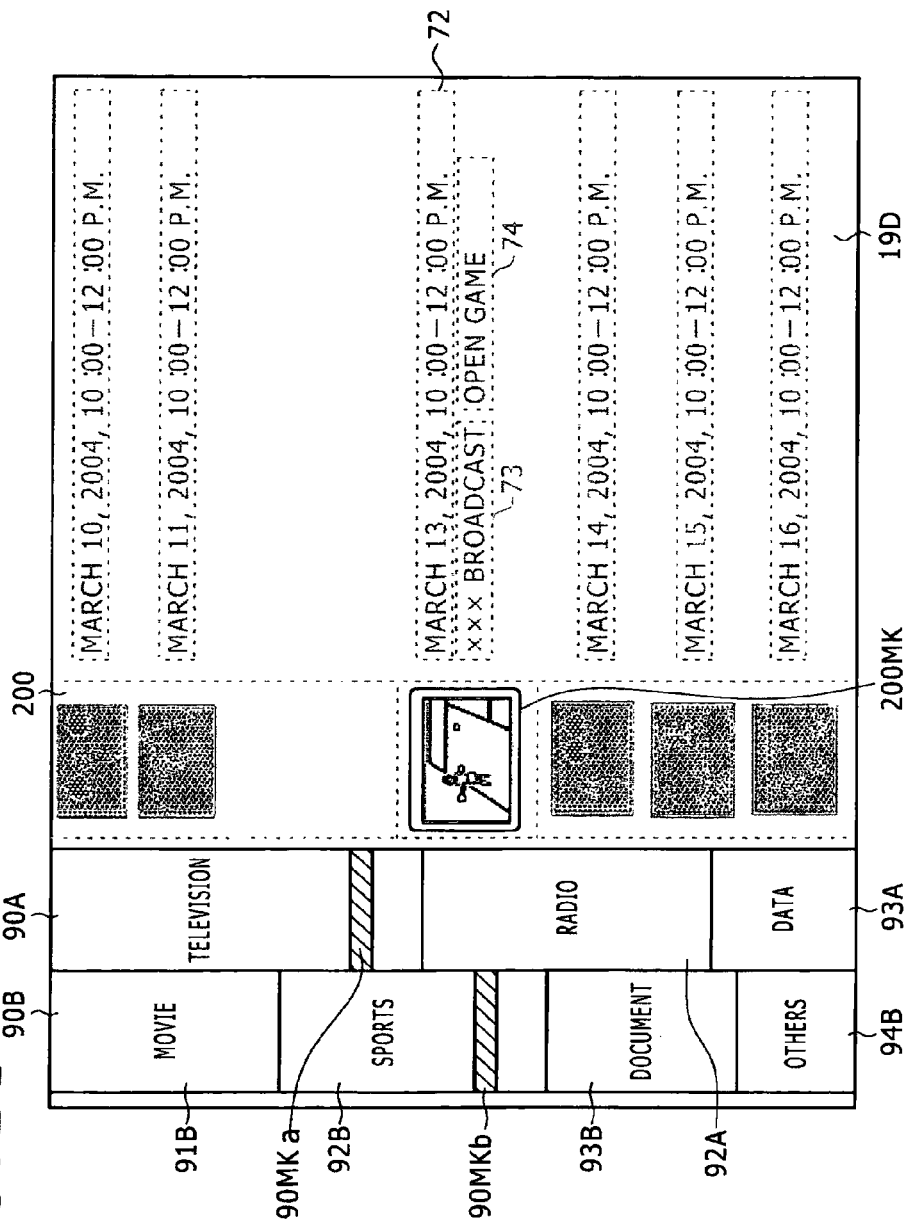

Then, in the group bar 90A, a noticed thumbnail image position indicating mark 90MKa indicating the content block to which the noticed thumbnail image belongs and the position of a corresponding broadcasting program content is additionally displayed, in the example of FIG. 21, as a transverse bar.

Meanwhile, the group bar 90B is divided in the vertical direction in accordance with the grouping in the content block set by the user described hereinabove corresponding to the content block including the noticed thumbnail image, that is, with lengths corresponding to the numbers of broadcasting program contents included in each group.

In the example shown in FIG. 21, the broadcasting program contents are divided into four groups of "movie", "sports", "document" and "others", and the group bar 90B is divided into four divisional regions 91B, 92B, 93B and 94B with lengths in the vertical direction corresponding to the numbers of broadcasting program contents included in the individual groups. A group name is displayed in each of the bars of the divisional regions 91B, 92B, 93B and 94B. Further, in the group bar 90B, a noticed thumbnail image position indicating mark 90MKb indicating the group and the position of the broadcasting program content corresponding to the noticed thumbnail image in the group bar 90B is displayed, in the present example, as a transverse bar.

The noticed thumbnail image position indicating marks 90MKa and 90MKb are displayed using a color which looks conspicuously to the user on the graphical user interface screen, for example, using bright yellow or the like similarly to the quadrangular framework 200MK for emphatically displaying the noticed thumbnail image.

It is to be noted that, while, in the example of the screen of FIG. 21, the category icon array 100 is erased, the category icon array 100 also in FIG. 21 may otherwise be kept displayed but thinly without being erased.

From the foregoing, also when the "HDD" category icon is selected, even if the scrolling speed becomes so high that the user cannot readily watch the noticed item icon displayed on the screen or the item icons preceding to and succeeding the noticed item icon as well as explanation information for them, the user can readily recognize from the position of the noticed item icon position indicating mark 80MK of the group bar 80 what channel position is being scrolled.

It is to be noted that, while, in the description above, the group bar 80 and the group bars 90A and 90B are displayed when the scrolling speed is high, they may otherwise be displayed simultaneously when the scrolling is started.

Or else, when a broadcasting medium category icon of "terrestrial", "BS", "CS" or the like or the "HDD" category icon is selected by the user, the group bar 80 and the group bars 90A and 90B may be displayed together without fail independently of the scrolling.

It is to be noted that thumbnail images as representation images of broadcasting program contents are displayed, in each group, in the order in accordance with the year, month, day and time of the storage. In the present embodiment, since the descending order or the ascending order is selected as the order in this instance in the setting mode by the user as described hereinabove, the thumbnail images are displayed in the order according to the setting.

Processing Action on the Graphical User Interface

Now, processing action on the graphical user interface is described with reference to flow charts of FIGS. 22 to 26 particularly in connection with processing action of the control section 1 which controls the behavior on the graphical user interface described above. It is to be noted that, in the following description, the initial menu screen including the category icon array 100 and the item icon array 200 is referred to as "cross-shaped menu".

Further, while, in the foregoing description, when item icons of a lower hierarchy of an item icon are displayed, explanation information regarding all of the item icons of the lower hierarchy is displayed together, in the following description, also with regard to the item icons of the lower hierarchy, explanation information of the noticed item icon among them is displayed initially, and when a scroll starting instruction is issued, explanation information of all of the item icons is displayed similarly to the item icons of the first hierarchy.

The broadcasting reception apparatus of the present embodiment is configured such that, after a main power supply switch is switched on, every time the power supply key of the remote controller transmitter 23 is depressed, the broadcasting reception apparatus repeats changeover between a state wherein the power supply is on and a standby state wherein the power is available only to those elements necessary to restore the state wherein the power supply is on. Then, when the power supply key is operated in the standby state to switch on the power supply, the broadcasting reception apparatus builds up to restore a state (last state) at a point of time immediately before the standby state is entered.

Further, in the following description, operation of the power supply key and the various buttons is performed on the remote controller transmitter 23 by the user, and the control section 1 supervises a signal from the remote controller reception section 24 to detect a key or button operated on the remote controller transmitter 23. However, for simplified description, such an expression that the control section 1 detects an operation of a key or button is used in the following description.

Figure 22:
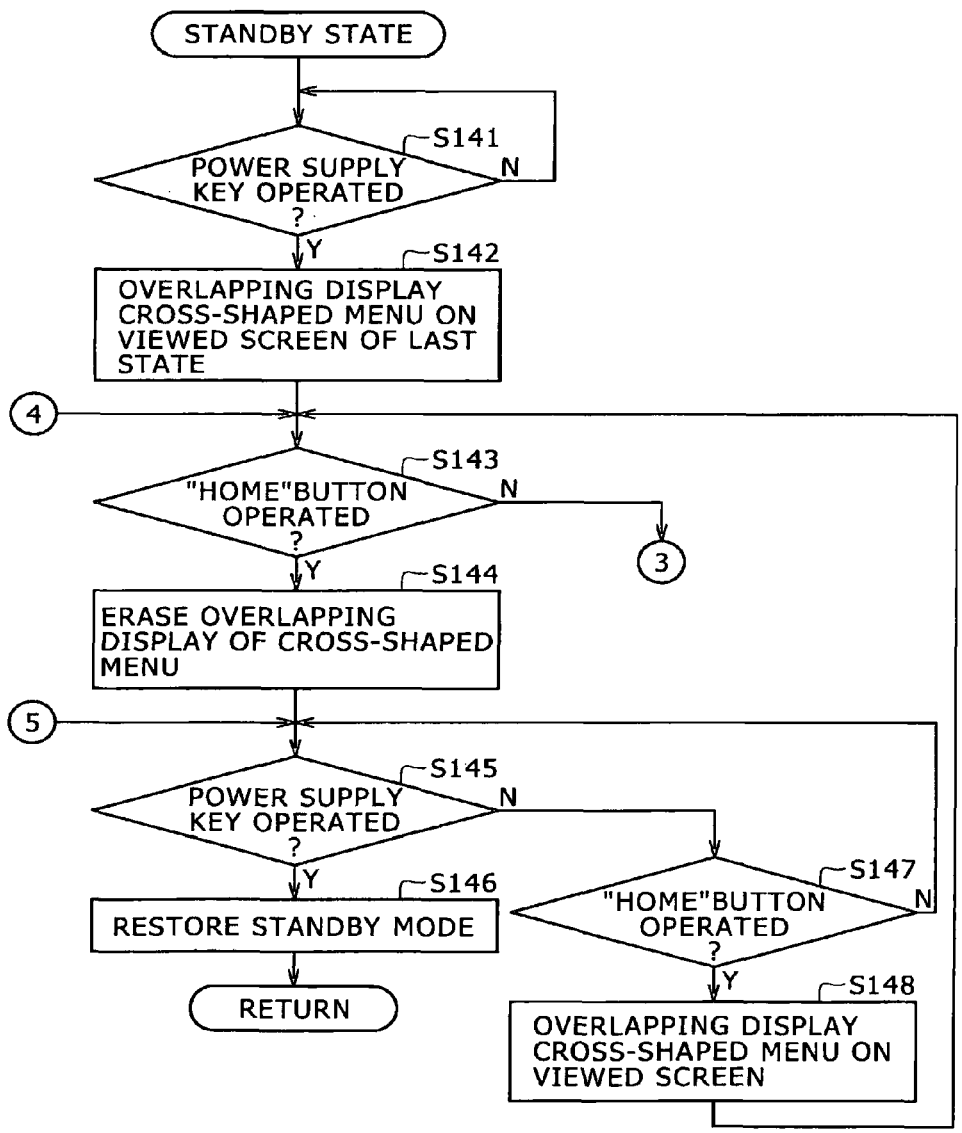

When the broadcasting reception apparatus of the present embodiment is in the standby state, the control section 1 normally supervises an operation input of the power supply key as seen in FIG. 22 (step S141). Then, if it is detected at step S141 that the power supply key is operated, then the control section 1 displays the screen of the last state on the screen 19D of the monitor display unit 19 and displays the cross-shaped menu in an overlapping relationship (step S142).

Then, the control section 1 decides whether or not the "home" button is operated by the user (step S143). If it is decided that the "home" button is depressed, then the control section 1 erases the overlapping display of the cross-shaped menu on the screen 19D (step S144).

Then, the control section 1 supervises an operation input of the power supply key again (step S145). Then, if an operation of the power supply key is detected, then the control section 1 stores the last state and restores the standby state (step S146), thereby ending the processing routine.

On the other hand, if it is decided at step S145 that the power supply key is not operated, then the control section 1 decides whether or not the "home" button is operated (step S147). If it is decided that the "home" button is not operated, then the processing returns to step S145. On the other hand, if it is decided at step S147 that the "home" button is operated, then the control section 1 displays the cross-shaped menu screen in an overlapping relationship on the screen 19D of the monitor display unit 19 being viewed (step S148). The processing thereafter returns to step S143.

Figure 23:
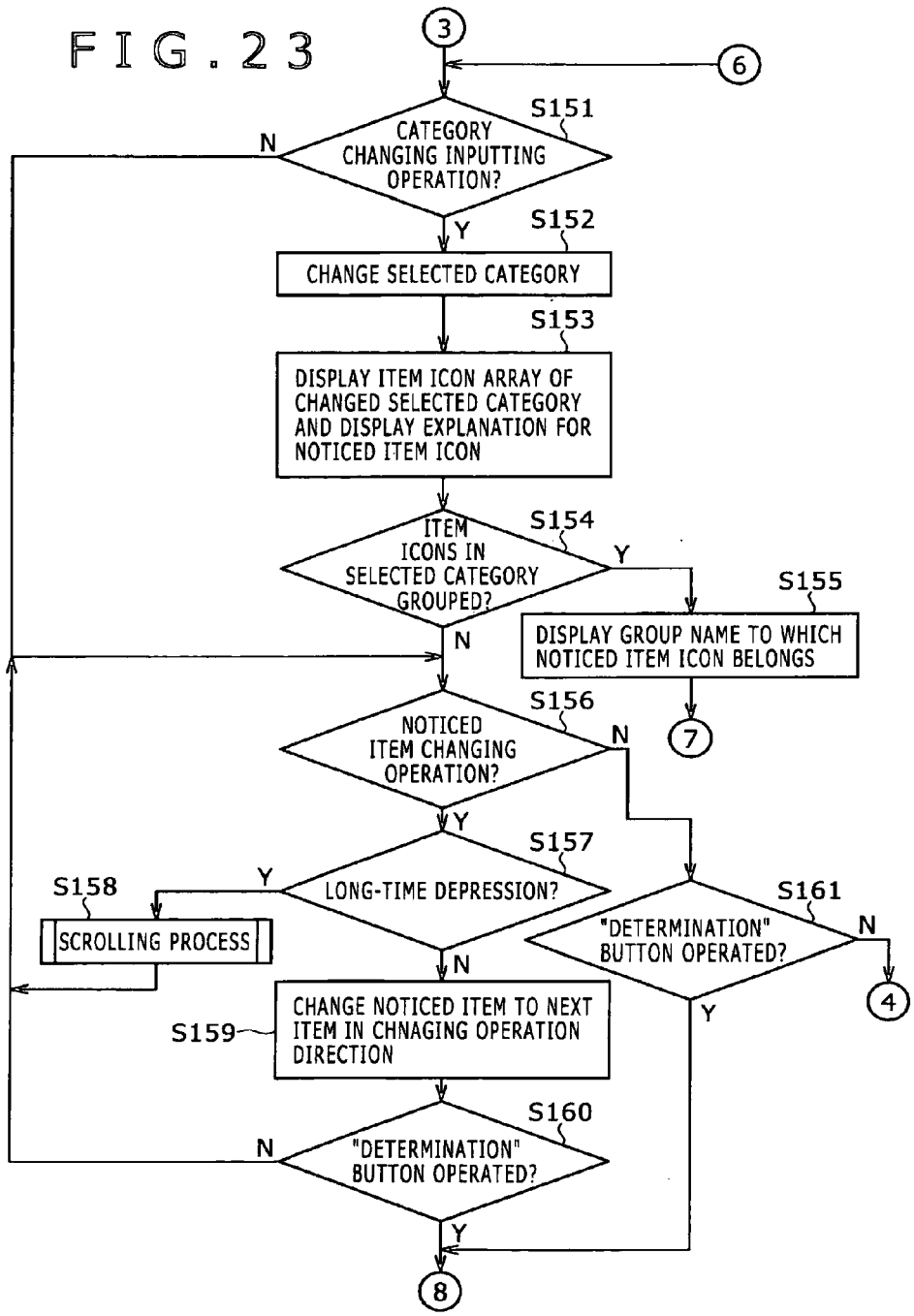

Then, if it is decided at step S143 that the "home" button is not operated, then the control section 1 decides whether or not a category changing inputting operation by the leftward or rightward direction indicating operation button of the remote controller transmitter 23 is performed on the graphical user interface screen formed from the cross-shaped menu being displayed in an overlapping relationship (step S151 of FIG. 23).

If it is decided at step S151 that a category changing inputting operation is performed on the cross-shaped menu screen displayed in an overlapping relationship, then the control section 1 controls the display image producing and outputting section 30 to change the selected category icon to that according to the changing instruction of the user on the cross-shaped menu screen. At this time, the control section 1 recognizes the category corresponding to the selected category icon as a selected category (step S152).

Then, the control section 1 displays an item icon array 200 belonging to the changed category icon and displays corresponding explanation on the right side of the noticed item icon (including the noticed thumbnail image: this similarly applies in the following description) of the item icon array 200 (step S153). Then, the control section 1 decides whether or not the item icons of the selected category icon are in a grouped state (step S154).

Then, if it is decided at step S154 that the item icons of the selected category icon are in a grouped state, then the control section 1 displays the group name to which the noticed item icon belongs in the group name displaying place 71 on the left side of the noticed item icon (step S155).

Figure 24:
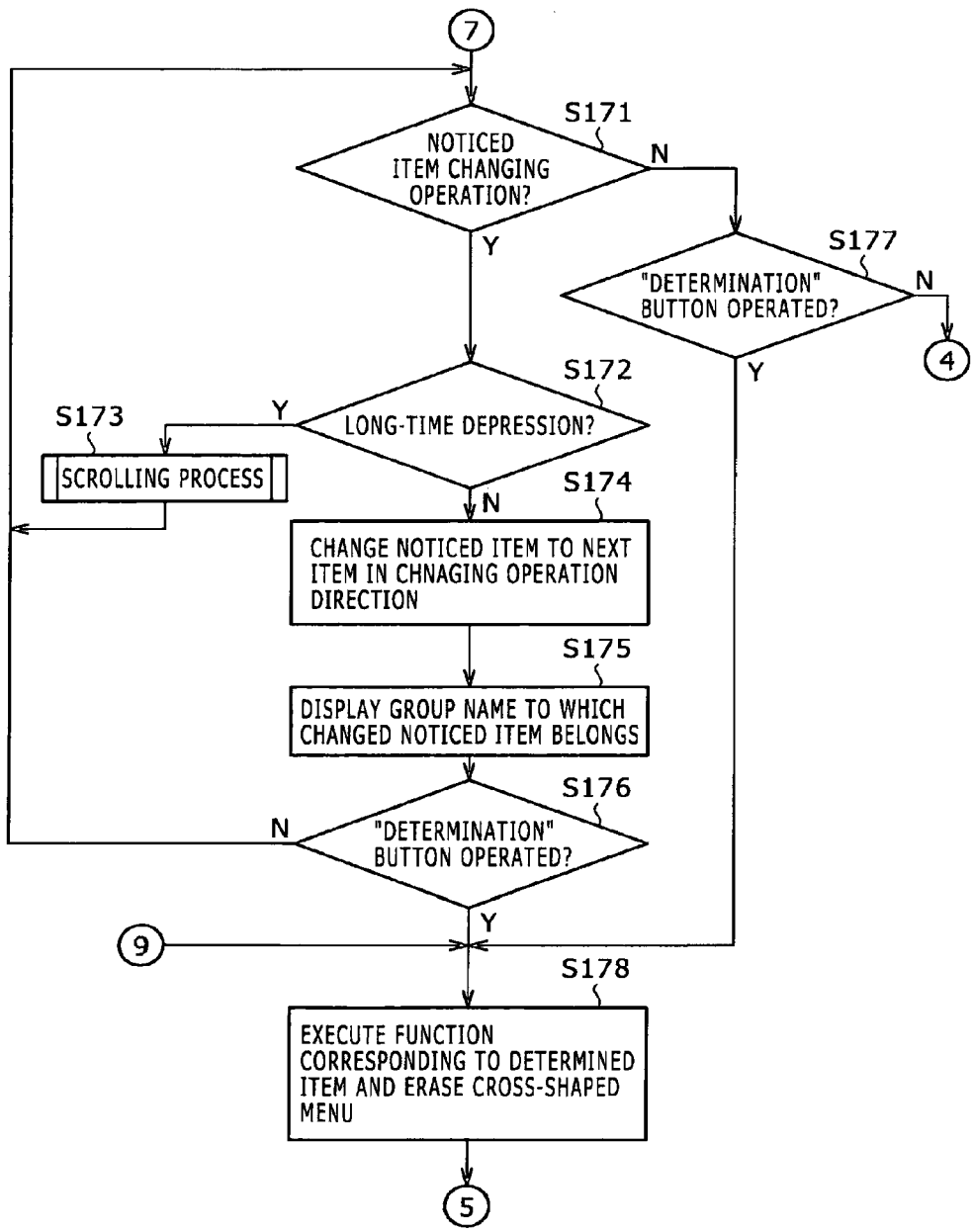

Then, the control section 1 decides whether or not the upward direction indicating operation button or the downward direction indicating operation button of the remote controller transmitter 23 is operated to decide whether or not a changing operation of the noticed item icon in the noticed region 200C is performed in the item icon array 200 of the cross-shaped menu (step S171 of FIG. 24).

Then, if it is decided at step S171 that one of the upward direction indicating operation button and the downward direction indicating operation button of the remote controller transmitter 23 is operated, then the control section 1 decides whether or not the button operation is long-time depression wherein the button operation continues for more than a predetermined period of time (step S172). Then, if it is decided that the button operation is long-time depression, then the control section 1 performs a scrolling process hereinafter described (step S173). Thereafter, the processing returns to step S171.

On the other hand, if it is decided at step S172 that the button operation is not long-time depression, then the control section 1 controls the display image producing and outputting section 30 to change the noticed item icon to be displayed in the noticed region 200C in the cross-shaped menu to an adjacent item icon next in the changing operation direction of the noticed item icon at present to determine an item corresponding to the item icon displayed newly in the noticed region 200C as a noticed item (step S174). Then, the control section 1 displays the group name to which the item of the noticed item icon after changed belongs in the group name displaying place 71 (step S175).

Then, the control section 1 decides whether or not the "determination" button is operated on the remote controller transmitter 23 (step S176). If it is decided that the "determination" button is not operated, then the processing returns to step S171 so that the processes at the steps beginning with step S171 described above are repeated.

On the other hand, if it is decided at step S171 that none of the upward direction indicating operation button and the downward direction indicating operation button of the remote controller transmitter 23 is operated, then the control section 1 decides whether or not the "determination" button is operated on the remote controller transmitter 23 (step S177). If it is decided that the "determination" button is not operated, then the processing returns to step S143 of FIG. 22 to repeat the processes at the steps beginning with step S143 described hereinabove.

On the other hand, if it is decided at step S176 or S177 that the "determination" button is operated, then the control section 1 executes a function corresponding to the determined item and erases the cross-shaped menu from the screen 19D (step S178). Thereafter, the processing returns to step S145 of FIG. 22 to execute the processes at the steps beginning with step S145.

If it is decided at step S154 that the item icons of the selected category icon are not in a grouped state, or if it is decided at step S151 that a category changing inputting operation is not performed, then the processing advances to step S156. At step S156, the control section 1 decides whether or not the upward direction indicating operation button or the downward direction indicating operation button of the remote controller transmitter 23 is operated, then the control section 1 decides whether or not the changing operation of the noticed item icon of the noticed region 200C is executed in the noticed item icon array 200 in the cross-shaped menu.

Then, if it is decided at step S156 that one of the upward direction indicating operation button and the downward direction indicating operation button of the remote controller transmitter 23 is operated, then the control section 1 decides whether or not the button operation is long-time depression which is a state wherein the button operation continues for more than a predetermined period of time (step S157). If it is decided that the button operation is long-time depression, then the control section 1 performs a scrolling process hereinafter described (step S158). Thereafter, the processing returns to step S156.

On the other hand, if it is decided at step S157 that the button operation is not long-time depression, then the control section 1 controls the display image producing and outputting section 30 to change the noticed item icon, which is to be displayed in the noticed region 200C on the cross-shaped menu, to an adjacent item icon next in the direction of the changing operation to the noticed item icon at present and determine an item corresponding to the item icon displayed newly in the noticed region 200C as a noticed item (step S159).

Then, the control section 1 decides whether or not the "determination" button is operated on the remote controller transmitter 23 (step S160). If it is decided that the "determination" button is not operated, then the processing returns to step S156 so that the processes at the steps beginning with step S156 described above are repeated.

On the other hand, if it is decided at step S156 that none of the upward direction indicating operation button and the downward direction indicating operation button of the remote controller transmitter 23 is operated, then the control section 1 decides whether or not the "determination" button is operated on the remote controller transmitter 23 (step S161). If it is decided that the "determination" button is not operated, then the processing returns to step S143 so that the processes at the steps beginning with step S143 described above are repeated.

Figure 25:
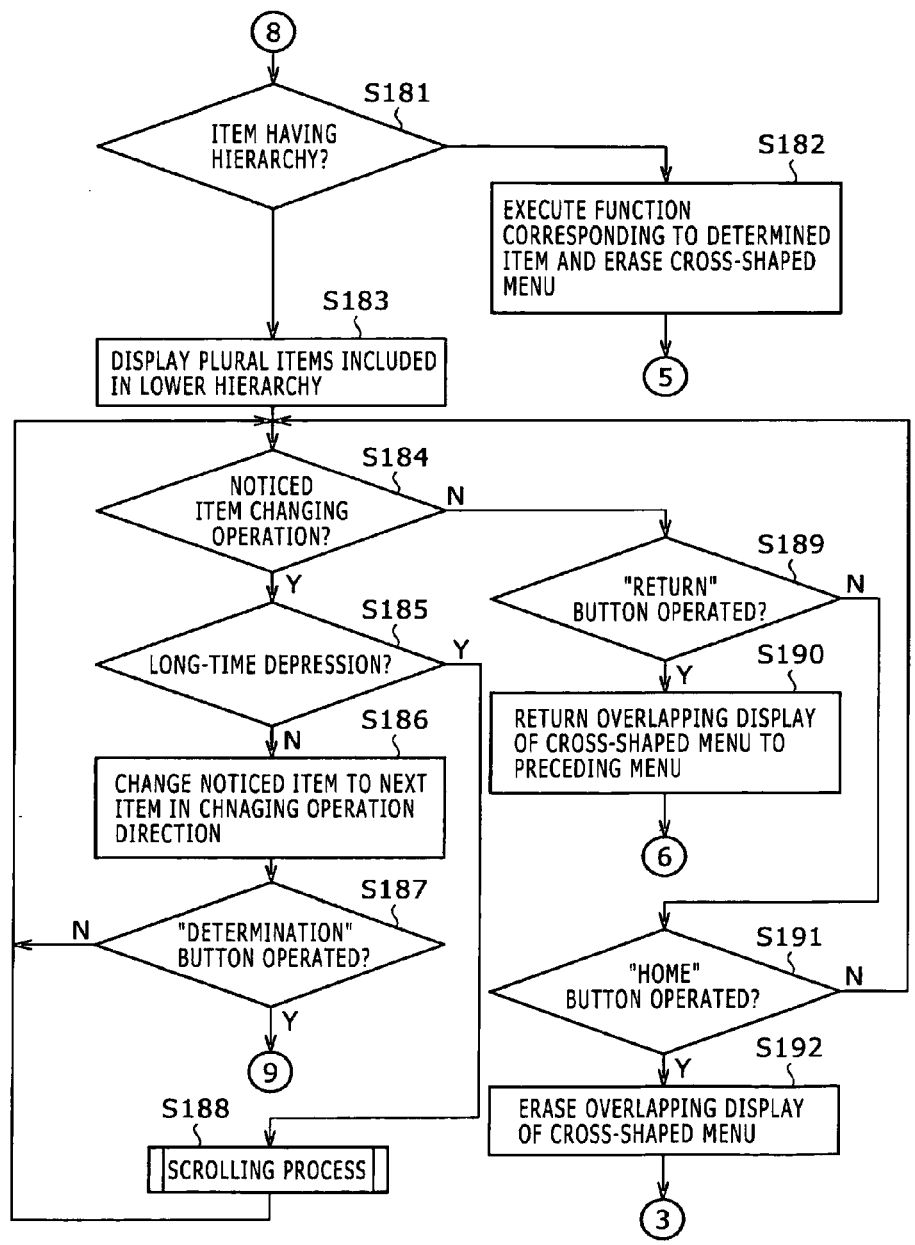

If it is decided at step S160 or step S161 that the "determination" button is operated, then the control section 1 decides whether or not the determined item has lower hierarchy items (step S181 of FIG. 25). If it is decided that the determined item has no lower hierarchy items, then the control section 1 erases the cross-shaped menu from the screen 19D and executes a function or process of the item which is currently regarded as the noticed item (step S182). Thereafter, the processing advances to step S145 of FIG. 22 so that the processes at the steps beginning with step S145 described hereinabove are repeated.

On the other hand, if it is decided at step S181 that the determined item has lower hierarchy items, then the control section 1 controls the display image producing and outputting section 30 to display a plurality of ones of the lower hierarchy items of the noticed item on the screen 19D (step S183). This state corresponds to the state wherein the "determination" button is depressed while the item icon of recording reservation is selected as the noticed item icon, and the display of the screen 19D at step S183 is, for example, such a display as shown in FIG. 7.

Then, the control section 1 decides whether or not the upward direction indicating operation button or the downward direction indicating operation button of the remote controller transmitter 23 is operated on the display screen of the lower hierarchy items to decide whether or not a changing operation of the noticed item icon of the lower hierarchy surrounded by the quadrangular framework 200MK is performed (step S184).

Then, if it is decided at step S184 that one of the upward direction indicating operation button and the downward direction indicating operation button of the remote controller transmitter 23 is operated, then the control section 1 decides whether not the button operation is long-time depression wherein the button operation continues for more than a predetermined period of time (step S185). Then, if it is decided that the button operation is long-time depression, then the control section 1 performs a scrolling process hereinafter described (step S188). Thereafter, the processing returns to step S184.

On the other hand, if it is decided at step S185 that the button operation is not long-time depression, then the control section 1 controls the display image producing and outputting section 30 to change the noticed item icon of the lower hierarchy surrounded by the quadrangular framework 200MK to an adjacent item icon next in the changing operation direction to the noticed item icon at present to determine an item corresponding to the item icon displayed newly in the region surrounded by the quadrangular framework 200MK as a noticed item (step S186).

Then, the control section 1 decides whether or not the "determination" button is operated on the remote controller transmitter 23 (step S187). If it is decided that the "determination" button is not operated, then the processing returns to step S184 so that the processes at the steps beginning with step S184 described above are repeated. On the other hand, if it is decided at step S187 that the "determination" button is operated, then the processing returns to step S178 of FIG. 24 so that the processes at the steps beginning with step S178 described hereinabove are repeated.

On the other hand, if it is decided at step S184 that none of the upward direction indicating operation button and the downward direction indicating operation button of the remote controller transmitter 23 is operated, then the control section 1 decides whether or not the "return" button is operated on the remote controller transmitter 23 (step S189). If it is decided that the "return" button is operated, then the control section 1 controls the display image producing and outputting section 30 so that the overlapping display of the cross-shaped menu is returned to the state of the immediately preceding screen (step S190). Then, the processing returns to step S151 of FIG. 23 so that the processes at the steps beginning with step S151 are repeated.

On the other hand, if it is decided at step S189 that the "return" button is not operated, then the control section 1 decides whether or not the "home" button is operated (step S191). If it is decided that the "home" button is depressed, then the control section 1 erases the overlapping display of the cross-Shaped menu on the screen 19D (step S192). Then, the processing advances to step S145 of FIG. 22 so that the processes at the steps beginning with step S145 are performed.

On the other hand, if it is decided at step S191 that the "home" button is operated, then the control section 1 returns the processing to step S184 to repeat the processes at the steps beginning with step S184.

Now, the scrolling process at step S158 of FIG. 23 or at step S188 of FIG. 25 is described with reference to a flow chart of FIG. 26.

As described hereinabove, the processing routine of FIG. 26 is started when long-time depression of the upward direction indicating operation button or the downward direction indicating operation button, which is regarded as a scrolling starting operation, is performed on the remote controller transmitter 23.

After the scrolling starting operation described above is detected, the control section 1 controls the display image producing and outputting section 30 to start scrolling in such a state that explanation information not only of the noticed item icon (including the noticed thumbnail image) but also of item icons preceding to and following the noticed item icon are displayed as seen in FIG. 17 or 19 (step S201). Then, the control section 1 successively changes the noticed item icon in the indicating direction of the operated button (step S202).

Then, the control section 1 controls the display image producing and outputting section 30 to gradually raise the scrolling speed and control the density or the like of the display of the cross-shaped menu screen in accordance with the scrolling speed as seen on the graphical user interface screen of FIG. 17 described hereinabove (step S203).

Thereafter, the control section 1 decides whether or not the scrolling speed exceeds a predetermined speed (step S204). If it is decided that the scrolling speed does not exceed the predetermined speed, then the control section 1 decides whether or not the long-time depression of the upward direction indicating operation button or the downward direction indicating operation button is stopped (step S205). If it is decided that the long-term depression is not stopped, then the control section 1 decides whether or not the last item in the scrolling direction is reached (step S206).

If it is decided at step S205 that the long-time depression is stopped, or if it is decided at step S206 that the last item in the scrolling direction is reached, then the control section 1 stops the scrolling and displays a cross-shaped menu screen on which the item at which the scrolling stops is displayed emphatically (step S207), thereby ending the processing.

If it is decided at step S204 that the scrolling speed exceeds the predetermined speed, then the control section 1 controls the display image producing and outputting section 30 to additionally display the group bar 80 or group bars 90A and 90B on the screen 19D as seen on the graphical user interface screen of FIG. 19 or 21 and display the noticed item icon position display mark 84 indicative of the group and the position of the noticed item icon in the group bar 80 (step S208). Then, the processing advances from step S208 to step S205.

In this manner, since, in the present embodiment, upon scrolling, not only explanation information of the noticed item icon or the noticed thumbnail image is displayed but also explanation information of item icons or thumbnail images preceding to and following the noticed item icon or the noticed thumbnail image are displayed, the user can perform a scrolling search readily.

Further, in the present embodiment, as the scrolling speed increases, the group bar 80 including the noticed item icon position display mark 80MK or the noticed thumbnail position display marks 90MKa and 90MKb appears on the scrolling screen so as to notify the user of the group and the position of the noticed item icon or the noticed thumbnail image in the item icon array 200. Therefore, the user can perform scrolling search readily by referring to the group bar 80 or the group bars 90A and 90B.

It is to be noted that, while, in the example described above, the scrolling in channel selection of the broadcasting media is performed only within the range of the channel selection, the scrolling may otherwise be performed including also the utility items.

Further, while the group bar 80 or the group bars 90A and 90B are displayed when the predetermined scrolling speed is reached, it may otherwise be displayed at a starting point of time of scrolling. Or, when the category icon of broadcasting media or the "HDD" category icon is selected and then the item icon array 200 belonging to the category icon is displayed, the group bar 80 or the group bars 90A and 90B may be displayed together.

Other Modifications

While, in the embodiment described above, the user can set grouping only for groups of stored broadcasting program contents, also it is possible to classify broadcasting channel items in the broadcasting form groups of the terrestrial, BS and CS broadcasts of the broadcasting medium category into groups in accordance with grouping setting of the user.

For example, if content attributes such as the genre and performers included in EPG data are presented as grouping criteria to the user and the user selectively sets any of the grouping criteria presented to the user, then the broadcasting channel items can be grouped based on the selectively set grouping criterion and arrayed in accordance with the grouping. In this instance, the group bars 90A and 90B similar to those of FIG. 21 are displayed.

It is to be noted that the selection object items represented by item icons or thumbnail images may be other contents. For example, the selection object items may be contents of electronic books, game programs or the like. Here, the contents are defined as those of movies, music, theatrical performances, literary arts, photographs, cartoons, animations, computer games, or other characters, figures, colors, sound, action or images, or combinations of them, or programs for providing such information through an electronic computer, which are created through creative activities of human beings and belong to the range of the culture or the amusement.

It is to be noted that, while, in the embodiments described above, the display position of the group bar is set to the left side with respect to the noticed item icon, it is not restricted to this position but may be set to some other position. Further, the group bar need not be displayed along an array of representation images such as an item icon array or a thumbnail image array, but may be displayed in a direction different from the direction of the array of representation images.

Further, the mark representing the noticed item icon position on the group bar is not limited to the example described above, but such a displaying method that, for example, a triangular mark or an arrow mark is displayed on the outer side of the bar may be used.

Further, while the representation images in the example described hereinabove with reference to the drawings are icons including a graphic form or a character or icons formed from a channel number or thumbnail images formed from images each obtained by reducing the size of some image of a broadcasting program, some other symbols or the like may be used as the representation images.

While, in the foregoing embodiments, the electronic apparatus of the present invention is a broadcasting reception apparatus, the electronic apparatus according to the present invention is not limited to such a broadcasting reception apparatus as described above but can be applied to any electronic apparatus, for example, such as the recording and reproduction apparatus for image data and sound data only if the electronic apparatus includes a plurality of categories each of which has a plurality of processing function items in a lower hierarchy thereof.

While a preferred embodiment of the present invention has been described using specific terms, such description is for illustrative purposes only, and it is to be understood that changes and variations may be made without departing from the spirit or scope of the following claims.

What is claimed is:

1. An electronic apparatus, comprising:
a number of interfaces to receive signals corresponding to image or audio programs from a number of different sources;
an operation inputting device configured to accept an operation input of a user for enabling selection of a desired image or audio program from a respective one of the number of interfaces;
a monitor display device, in which the display device is formed from a Cathode Ray Tube (CRT) or a Liquid Crystal Display (LCD);
a display data storage section configured to store a plurality of display data of representation images individually representing a plurality of processing object items of processing functions individually with regard to plural processing functions;
a memory having a program stored therein; and
a central processing unit (CPU), which upon executing the program from the memory, is configured to operate as
a processing function execution section for executing the plural processing functions; and
a display control section to facilitate the selection of the desired image or audio program, said display control section including a decision section for deciding, when said operation inputting device accepts a selection operation input for selecting one of the plural processing functions, whether or not the plural processing object items of the selected processing function is divided in a plurality of groups, and a group name displaying section for displaying on a screen of a display device, only when said decision section decides that the plural processing object items are divided in a plurality of groups, a group name or names of the group or groups to which the processing object item of a noticed representation image belongs, in the proximity of the noticed representation image, the noticed representation image being selected in response to an operation input through said operation inputting device.

2. The electronic apparatus according to claim 1, wherein said display control section causes the plural representation images to be displayed translucently in an overlapping relationship on the screen of an image of image content displayed on said display device.

3. An electronic apparatus, comprising:
a number of interfaces to receive signals corresponding to image or audio programs from a number of different sources;
an operation inputting device configured to accept an operation input of a user for enabling selection of a desired image or audio program from a respective one of the number of interfaces;
a display data storage section configured to store a plurality of display data of representation images individually representing a plurality of processing object items of processing functions individually with regard to plural processing functions;
a monitor display device, in which the display device is formed from a Cathode Ray Tube (CRT) or a Liquid Crystal Display (LCD);
a memory having a program stored therein; and
a central processing unit (CPU), which upon executing the program from the memory, is configured to operate as
a processing function execution section for executing the plural processing functions; and
a display control section to facilitate the selection of the desired image or audio program, said display control section including a decision section for deciding, when said operation inputting device accepts a selection operation input for selecting one of the plural processing functions, whether or not the plural processing object items of the selected processing function is divided in a plurality of groups, and a bar displaying section for additionally displaying, only when said decision section decides that the plural processing object items are divided in a plurality of groups, a bar display which is divided in accordance with the plural groups and includes, at each of the divisional portions thereof, a mark including a group name display and indicating at which position a noticed representation image is positioned in an array of the plural representation images including the noticed representation image on a display screen of the display device, the noticed representation image being selected in response to an operation input through said operation input device.

4. The electronic apparatus according to claim 3, wherein said display control section is configured to cause the plural representation images to be displayed translucently in an overlapping relationship on the screen of an image of image content displayed on said display device.

5. An electronic apparatus, comprising:
an operation inputting device configured to accept an operation input of a user;
a display data storage section configured to store a plurality of display data of representation images individually representing a plurality of processing object items of processing functions individually with regard to plural processing functions;
a monitor display device, in which the display device is formed from a Cathode Ray Tube (CRT) or a Liquid Crystal Display (LCD);
a memory having a program stored therein; and
a central processing unit (CPU), which upon executing the program from the memory, is configured to operate as
a processing function execution section for executing the plural processing functions; and
a display control section including a decision section for deciding, when said operation inputting device accepts a selection operation input for selecting one of the plural processing functions, whether or not the plural processing object items of the selected processing function is divided in a plurality of groups, and a bar displaying section for additionally displaying, only when said decision section decides that the plural processing object items are divided in a plurality of groups, a bar display which is divided in accordance with the plural groups and includes, at each of the divisional portions thereof, a mark including a group name display and indicating at which position a noticed representation image is positioned in an array of the plural representation images including the noticed representation image on a display screen of the display device, the noticed representation image being selected in response to an operation input through said operation input device,
wherein the bar display is caused to be displayed on the screen of said display device when scrolling is performed in accordance with a scrolling instruction of the plural display images inputted through said operation inputting device.

6. A display controlling method for an electronic apparatus, comprising:
receiving, by way of a number of interfaces of the electronic apparatus, signals corresponding to image or audio programs from a number of different sources;
storing, in a display data storage section of the electronic apparatus, a plurality of display data of representation images individually representing a plurality of processing object items regarding plural processing functions individually with regard to the plural processing functions;
accepting an operation input of a user for enabling selection of a desired image or audio program from a respective one of the number of interfaces by use of an operation inputting device;
deciding by use of a central processing unit (CPU) of the electronic apparatus, when said operation inputting device accepts a selection operation input for selecting one of the plural processing functions, whether or not the plural processing object items of the selected processing function is divided in a plurality of groups;
first causing by use of the CPU a monitor display device to display on a display screen, when the deciding decides that the plural processing object items are not divided in a plurality of groups, the plural representation images using the display data stored in said display data storage section such that the plural representation images are arrayed along one direction of the display screen and one of the plural representation images can be selected as a noticed representation image in response to an operation input through said operation inputting device; and
second causing by use of the CPU the display device to display on the display screen, only when the deciding decides that the plural processing object items are divided in a plurality of groups, the group names of the groups to which the processing object item of the noticed representation image belongs in the proximity of the noticed representation image in addition to the display displayed by the first causing,
in which the display device is formed from a Cathode Ray Tube (CRT) or a Liquid Crystal Display (LCD), and
in which the deciding, the first causing and second causing facilitates the selection of the desired image or audio program.

7. The display controlling method for an electronic apparatus according to claim 6, in which the plural representation images are displayed translucently in an overlapping relationship on the display screen of an image of image content displayed on said display screen.

8. A display controlling method for an electronic apparatus, comprising:
a step of storing, into a display data storage section of the electronic apparatus, a plurality of display data of representation images individually representing a plurality of processing object items regarding plural processing functions individually with regard to the plural processing functions;
a step of accepting an operation input of a user by use of an operation inputting device of the electronic apparatus;
a decision step of deciding by use of a central processing unit (CPU) of the electronic apparatus, when said operation inputting section accepts a selection operation input for selecting one of the plural processing functions, whether or not the plural processing object items of the selected processing function is divided in a plurality of groups;
a first displaying step of displaying, when it is decided that the plural processing object items are not divided in a plurality of groups, the plural representation images such that the plural representation images are arrayed along one direction of a display screen of a display device and one of the plural representation images can be selected as a noticed representation image in response to an operation input through said operation inputting device; and
a second displaying step of additionally displaying, only when it is decided at the decision step that the plural processing object items are divided in a plurality of groups, a bar display which is divided in accordance with the plural groups and includes, at each of the divisional portions thereof, a mark including a group name display and indicating at which position the noticed representation image is positioned in an array of the plural representation images including the noticed representation image on said display screen,
in which the display device is formed from a Cathode Ray Tube (CRT) or a Liquid Crystal Display (LCD), and
in which the second displaying step includes causing the bar display to be displayed on the screen of said display device when scrolling is performed in accordance with a scrolling instruction of the plural display images inputted through said operation inputting device.

9. The display controlling method for an electronic apparatus according to claim 8, wherein the first displaying step displays the plural representation images translucently in an overlapping relationship on the screen of an image of image content displayed on said display screen.

* * * * *